(12) United States Patent  
Washizuka et al.

(10) Patent No.: US 6,695,400 B2
(45) Date of Patent: Feb. 24, 2004

(54) CHILD CAR SEAT AND BABY CARRIAGE

(75) Inventors: Mitsuru Washizuka, Saitama (JP); Nobuaki Takamizu, Saitama (JP)

(73) Assignee: Combi Corporation, Tokyo-To (JP)

( * ) Notice: Subject to any disclaimer, the term of this patent is extended or adjusted under 35 U.S.C. 154(b) by 78 days.

(21) Appl. No.: 09/989,422

(22) Filed: Nov. 21, 2001

(65) Prior Publication Data
US 2002/0063450 A1 May 30, 2002

(30) Foreign Application Priority Data

Nov. 24, 2000 (JP) .................................. 2000-357756
Jan. 10, 2001 (JP) .................................. 2001-002554
Jan. 15, 2001 (JP) .................................. 2001-006463

(51) Int. Cl.$^7$ ................................ B60N 2/28
(52) U.S. Cl. ................ 297/130; 297/183.2; 297/217.2; 297/256.16
(58) Field of Search ............... 297/130, 183.2, 297/183.3, 217.2, 250.1, 256.16, 253

(56) References Cited

U.S. PATENT DOCUMENTS

| 4,634,177 A | * | 1/1987 | Meeker | 297/256.13 |
|---|---|---|---|---|
| 4,744,599 A | * | 5/1988 | Jankowski et al. | 297/256.16 |
| 4,913,490 A | * | 4/1990 | Takahashi et al. | 297/256.14 |
| 4,989,888 A | | 2/1991 | Qureshi et al. | |
| 5,567,008 A | * | 10/1996 | Cone, II | 297/256.16 |
| 5,772,279 A | | 6/1998 | Johnson, Jr. | |
| 5,865,447 A | * | 2/1999 | Huang | 297/256.16 |
| 6,183,044 B1 | * | 2/2001 | Koyanagi et al. | 297/256.16 |
| 6,299,249 B1 | * | 10/2001 | Mori | 297/256.13 |
| 6,322,142 B1 | * | 11/2001 | Yoshida et al. | 297/250.1 |

FOREIGN PATENT DOCUMENTS

| DE | 41 37 575 C1 | 2/1993 |
|---|---|---|
| EP | 0 537 019 A2 | 4/1993 |
| EP | 0 776 784 A1 | 6/1997 |
| EP | 0 936 104 A1 | 8/1999 |
| GB | 2 268 394 | 1/1994 |

* cited by examiner

Primary Examiner—Peter R. Brown
(74) Attorney, Agent, or Firm—Birch, Stewart, Kolasch & Birch, LLP

(57) ABSTRACT

A child car seat (10) to be to be mounted on a car seat has a child car seat body (10a). The child car seat body (10a) is provided with belt guides (13, 17). The child car seat (10) is mounted on a car seat (25). A seat belt (26) is engaged with the belt guides (13, 17) of the child car seat body (10a) to fasten the child car seat (10) to the car seat (25).

16 Claims, 19 Drawing Sheets

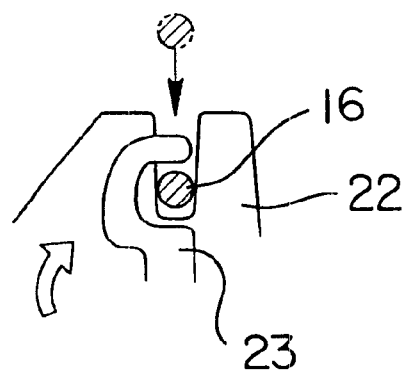 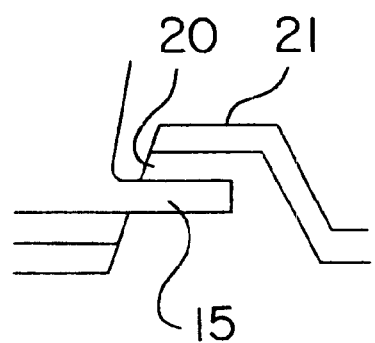
FIG. 3A  FIG. 3B
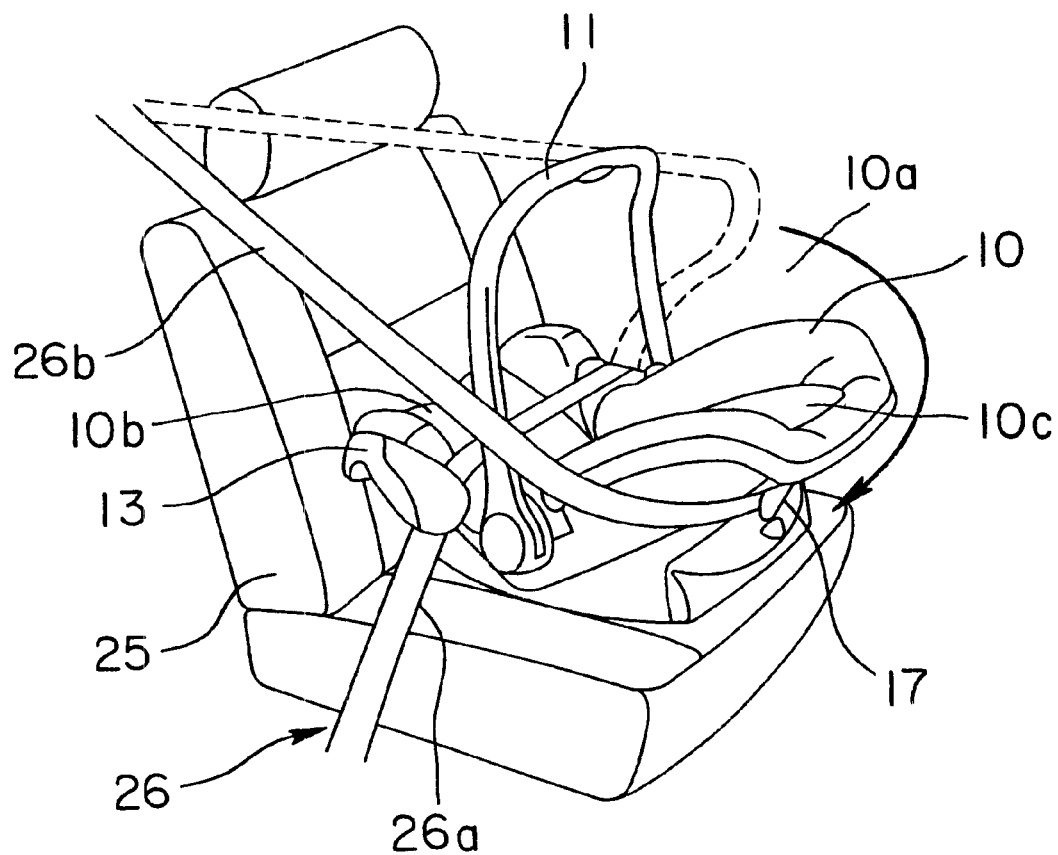
FIG. 4

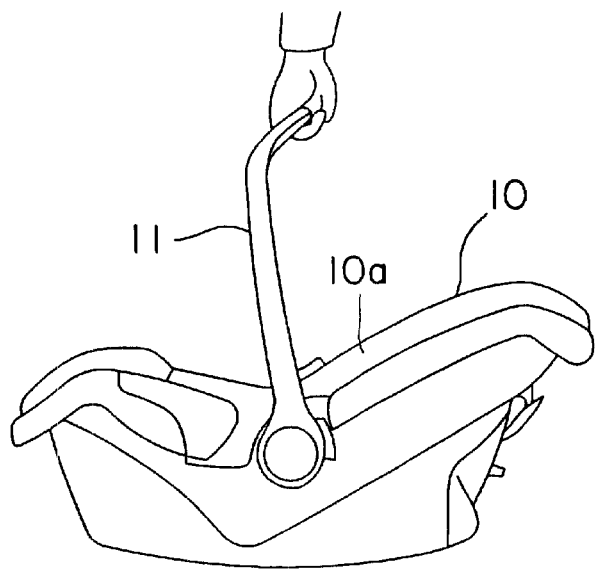
F I G. 9
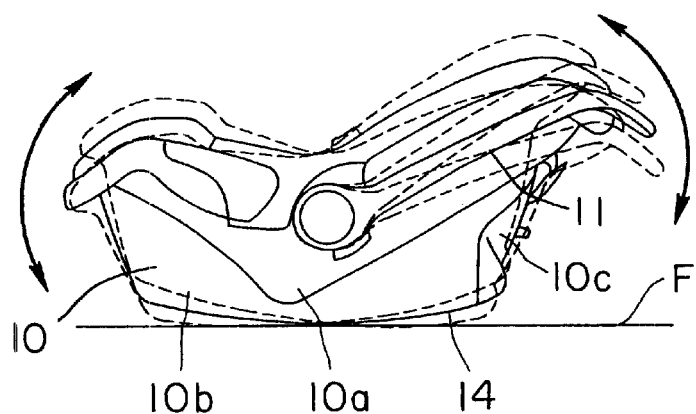
F I G. 10
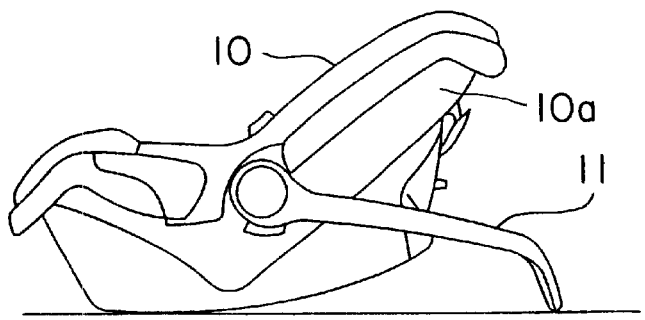
F I G. 11

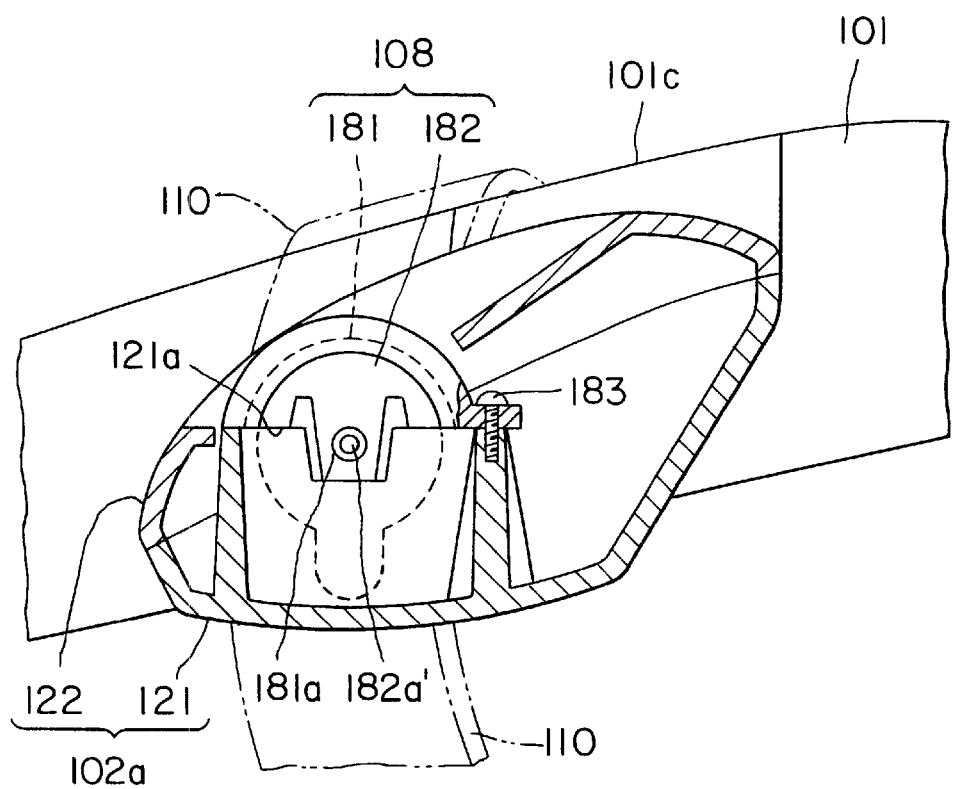
F I G. 14
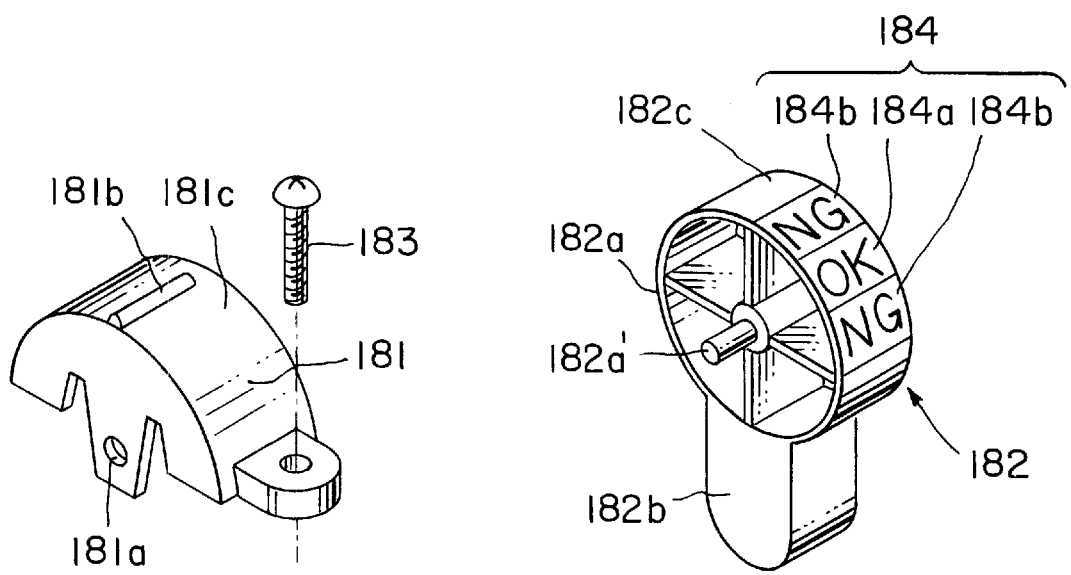
F I G. 15A  F I G. 15B

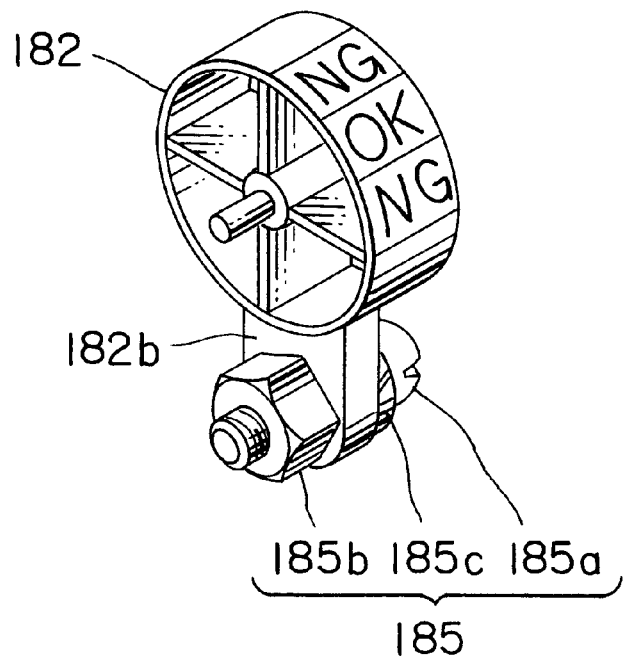
F I G. 16A
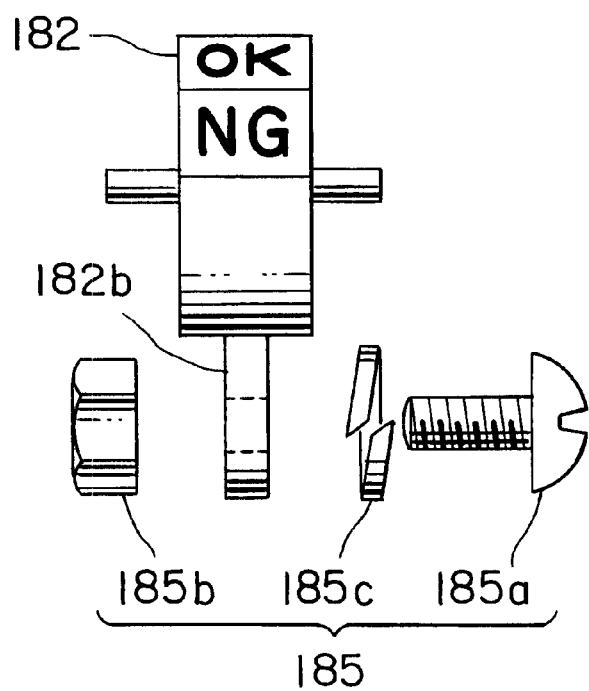
F I G. 16B

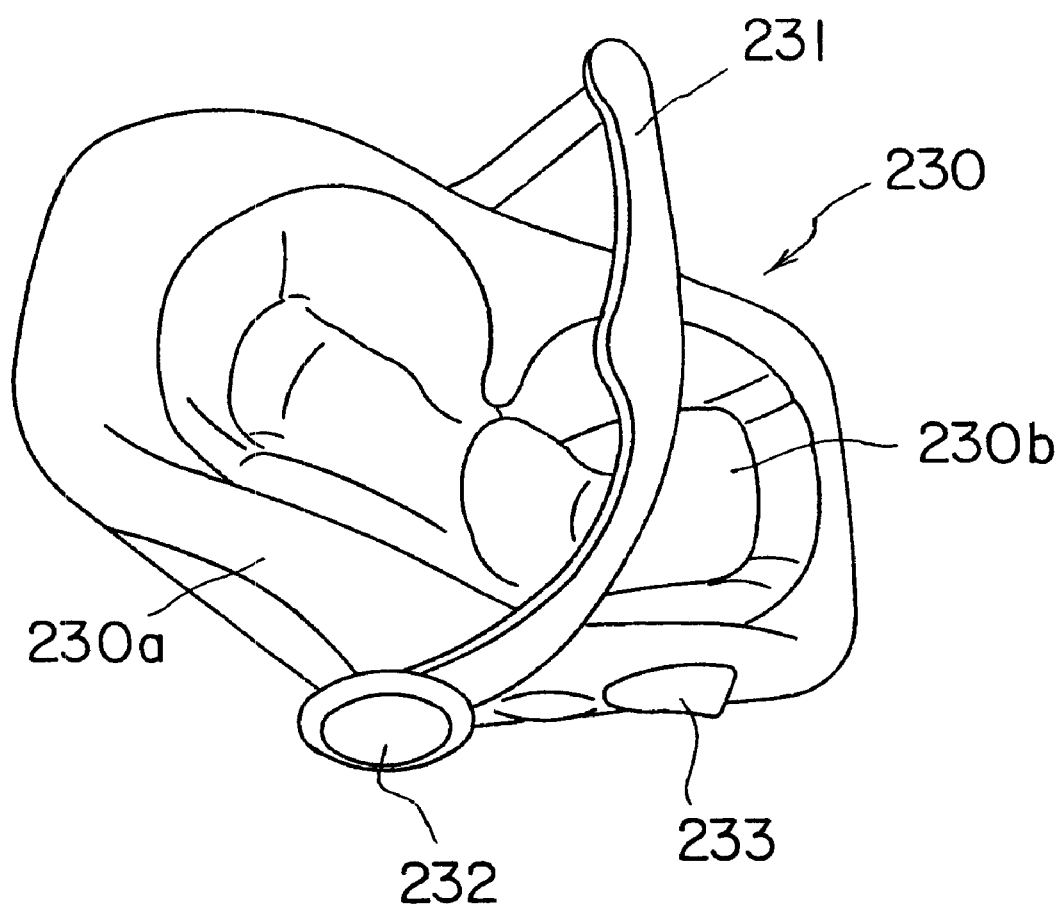
F I G. 21

CHILD CAR SEAT AND BABY CARRIAGE

BACKGROUND OF THE INVENTION

1. Field of the Invention

The present invention relates to a child car seat and a baby carriage and, more particularly, to a detachable child car seat and a baby carriage.

2. Description of the Related Art

Generally, a child car seat is used for holding a baby under the age of one on a passenger car. Such child car seats include those to be fastened to a fastening device incorporated to a seat of a passenger car and those to be fastened to a seat of a passenger car by a seat belt used to fasten a person to a seat of a passenger car. Child car seats of any type are detachably attached to the seat of a car.

A child car seat removed from the seat of a passenger car can be used as a carrier for carrying a baby lying on the child car seat or can be placed on the floor to use the same as a rocking chair or an ordinary chair.

Child car seats which can be easily and firmly combined with a car seat have not been developed.

There has been a demand for the development of a baby carriage provided with a child car seat.

SUMMARY OF THE INVENTION

The present invention has been made in view of the foregoing problem and it is therefore an object of the present invention to provide a child car seat capable of being easily and firmly fastened to a car seat by a seat belt installed on a car, and a baby carriage provided with a child car seat.

According to the present invention, a child car seat to be mounted on a car seat provided with a seat belt includes a child car seat body to be fastened to the car seat, and a fastening means incorporated into the child car seat body to fasten the child car seat body to the car seat.

In the child car seat according to the present invention, the fastening means includes belt guides included in the child car seat body and capable of engaging with the seat belt.

In the child car seat according to the present invention, the fastening means includes a holding base included in the child car seat body and capable of being connected to fixing members included in the car seat.

In the child car seat according to the present invention, the holding base is provided with a holding opening and grooves opening upward, the child car seat body is provided with a holding part which engages in the holding opening, and a holding rod which engages in the grooves.

In the child car seat according to the present invention, the child car seat body is provided with locking devices which engage with projections formed on a baby carriage body of a baby carriage.

In the child car seat according to the present invention, each of the locking devices includes a locking member which turns relative to the child car seat body and engages with the projection of the baby carriage body to lock the child car seat body in place.

In the child car seat according to the present invention, the locking member is biased always in a locking direction.

In the child car seat according to the present invention, handle holders connect a handle to the child car seat body so as to be turnable, and the locking devices are held in the handle holders, respectively.

In the child car seat according to the present invention, the locking member is provided with a hook capable of engaging with the projection from below, and a guide surface is formed in the lower surface of the hook so as to come into contact with the projection and to turn the locking member in an releasing direction when the child car seat is mounted on the baby carriage body.

In the child car seat according to the present invention, the locking device includes a stopper which engages with a protrusion formed on the locking member when the locking member is turned in the releasing direction to hold the locking member automatically at a releasing position, and the stopper is capable of turning about an axis eccentric to an axis about which the locking member turns.

In the child car seat according to the present invention, the stopper has a releasing arm extending downward, a releasing part projects from a lower part of the releasing arm, and the releasing part comes into contact with the projection of the baby carriage body to disengage the protrusion of the locking member from the stopper when the child car seat is lifted up so that the locking member is returned automatically from the releasing position.

In the child car seat according to the present invention, handle holders join a handle for turning to the child car seat body.

In the child car seat according to the present invention, the belt guide is provided with an angle gage.

In the child car seat according to the present invention, the angle gage includes an angle gage case, and an angular position-indicating wheel supported on the angle gage case.

In the child car seat according to the present invention, angular ranges are indicated on the angular position indicating wheel, and the angle gage case is provided with a window through which the angular ranges can be seen or a mark for indicating the angular range.

In the child car seat according to the present invention, the angle gage is combined with the belt guide such that an indication of the angular range on the angle gage can be visually observed from above the angle gage.

In the child car seat according to the present invention, the angular position-indicating wheel is provided with a balancer in its lower part.

In the child car seat according to the present invention, the angle gage is disposed at a position near a seat belt extending route on the child car seat body.

According to the present invention, a baby carriage comprises a baby carriage body provided with a pair of armrests, and a child car seat capable of being detachably installed on the baby carriage body, wherein each armrest is provided with a projection, and the child car seat includes a child car seat body, and locking devices capable of engaging with the projections.

In the baby carriage according to the present invention, the locking device includes a locking member which turns relative to the child car seat body and engages with the projection to lock the child car seat body in place.

In the baby carriage according to the present invention, the locking member is biased always in a locking direction.

In the baby carriage according to the present invention, handle holders connect a handle to the child car seat body so as to be turnable, and the locking devices are held in the handle holders, respectively.

In the baby carriage according to the present invention, the locking member is provided with a hook capable of engaging with the projection from below, and a guide surface is formed in the lower surface of the hook so as to come into contact with the projection and to turn the locking member in an releasing direction when the child car seat is installed on the baby carriage body.

In the baby carriage according to the present invention, the locking device includes a stopper which engages with a projection formed on the locking member when the locking member is turned in the releasing direction to hold the locking member automatically at a releasing position, and the stopper is capable of turning about an axis eccentric to an axis about which the locking member turns.

In the baby carriage according to the present invention, the stopper has a releasing arm extending downward, a releasing part projects from a lower part of the releasing arm, and the releasing part comes into contact with the projection to disengage the protrusion of the locking member from the stopper when the child car seat is lifted up so that the locking member is returned automatically from the releasing position.

In the baby carriage according to the present invention, handle holders join a handle for turning to the child car seat body.

BRIEF DESCRIPTION OF THE DRAWINGS

FIG. 3A is a schematic view of assistance in explaining a joining mechanism for joining the child car seat shown in FIG. 1 to a base;

FIG. 3B is a schematic view of assistance in explaining a joining mechanism for joining the child car seat shown in FIG. 1 to a base;

FIG. 4 is a perspective view showing the child car seat shown in FIG. 1 in a universal type mounted on a seat;

FIG. 9 is a side elevation of the child car seat shown in FIG. 1 in use as a carrier;

FIG. 10 is a side elevation of the child car seat shown in FIG. 1 in use as a rocking chair;

FIG. 11 is a side elevation of the child car seat shown in FIG. 1 in use as an ordinary chair;

FIG. 14 is a sectional view of assistance in explaining a belt guide provided with an angle gage;

FIG. 15A is a perspective view of an angle gage case;

FIG. 15B is a perspective view of an angular position indicating wheel;

FIG. 16A is a perspective view of another possible angular position indicating wheel;

FIG. 16B is an exploded side elevation of the angular position indicating wheel shown in FIG. 16A;

FIG. 21 is a perspective view of a child car seat included in the baby carriage in the third embodiment;

DESCRIPTION OF THE PREFERRED EMBODIMENTS

First Embodiment

A first embodiment of the present invention will be described with reference to FIGS. 1 to 11.

Figure 1:
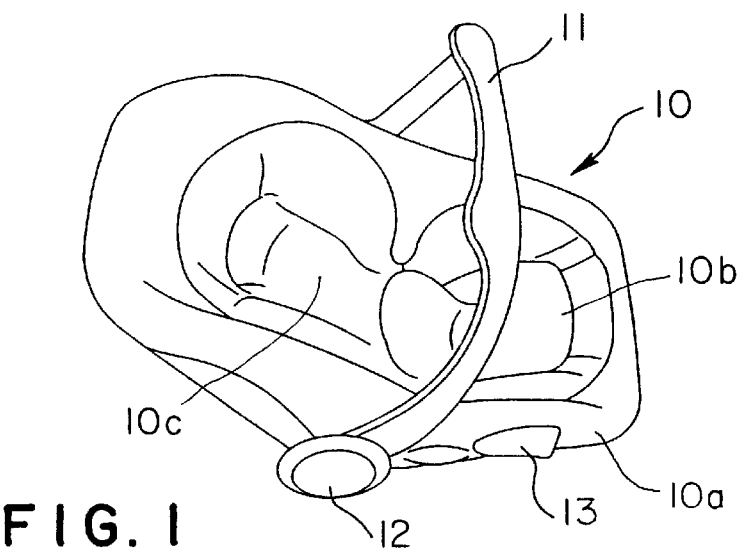
FIG. 1 is a perspective view of a child car seat in a first embodiment according to the present invention.

Referring to FIG. 1 showing a child car seat 10 having a child car seat body 10a in a perspective view, a handle 11 serving also as a canopy support is connected for turning to the child car seat body 10a. Handle holders 12 are formed on the opposite sidewalls of the child car seat body 10a, and opposite end parts of the handle 11 are inserted in the handle holders 12, respectively. The handle 11 can be turned or fixed. As shown in FIG. 4, hook-shaped belt guides 13 (fastening means) are extended rearward on the opposite sides of a seat part 10b of the child car seat body 10a. The belt guides 13 are used for fastening the child car seat body 10a to a seat 25 of a passenger car with a seat belt 26.

Figure 2:
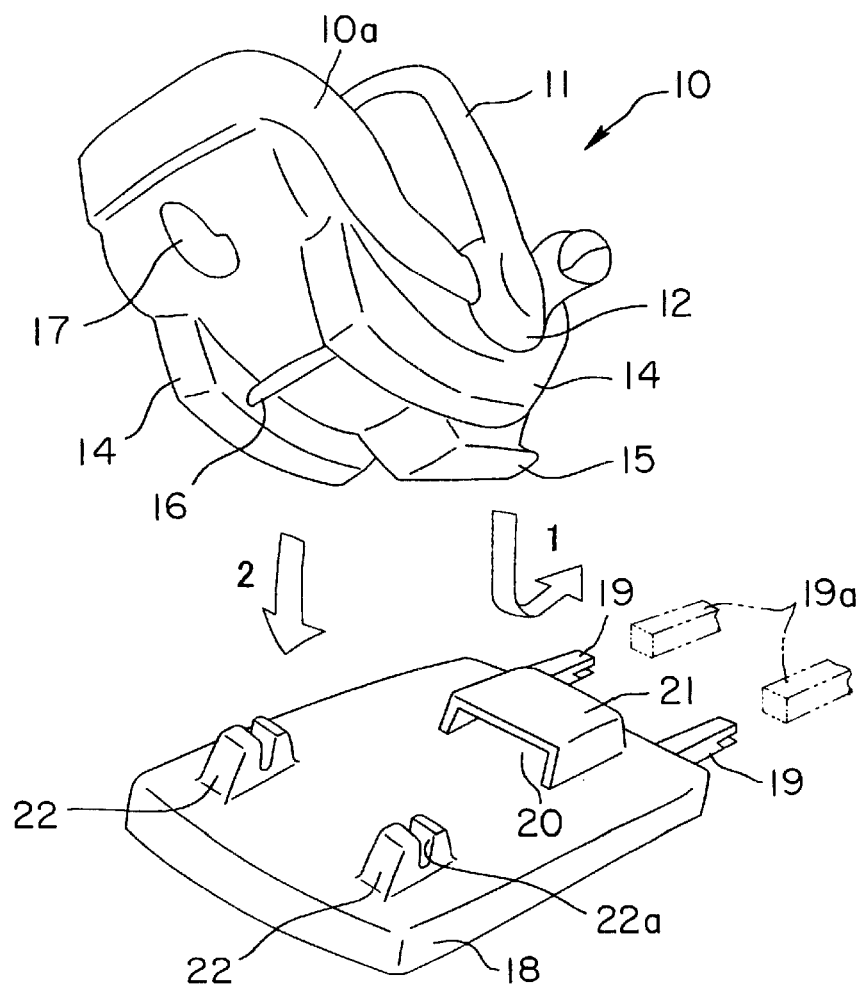
FIG. 2 is an exploded perspective view of the child car seat shown in FIG. 1 in an ISO type.

As shown in FIG. 2, parallel, convexly curved rocking frames 14 are formed on right and left parts of the bottom surface of the child car seat body 10a. An L-shaped holding projection (holding part) 15 is formed in a space between the rocking frames 14 so as to extend forward. A latching rod 16 is extended laterally on a rear part of the bottom surface of the child car seat body 10a. A hook-shaped second belt guide 17 (fastening means) is formed on the back surface of a back part 10c of the child car seat body 10a so as to extend upward along the back surface.

A holding base 18 (fastening means) is used for fixedly holding the child car seat 10 on the seat 25. The holding base 18 is provided with fixing arms 19 projecting forward from its front end, a holding part 21 formed on its upper surface and defining a longitudinally opening 20 opening to the rear side, and two latching protrusions 22 provided with grooves 22a, 22a respectively. The fixing arms 19 engage with fixing members 19a placed on the seat 25.

When fixedly holding the child car seat 10 on the seat 25 by the holding base 18, the holding projection 15 formed on a front part of the bottom surface of the child car seat body 10a is inserted in the longitudinally opening 20 of the holding base 18 as shown in FIG. 3B, a rear part of the child car seat body 10a is lowered to engage the latching rod 16 in the grooves 22a of the latching protrusions 22, and a locking lever 23 supported on the holding base 18 is engaged with the latching rod 16 to hold the child car seat body 10a on the holding base 18. Subsequently, the fixing arms 19 of the holding base 18 are engaged with the fixing members 19a of the seat 25. Thus, the child car seat body 10a can be fixedly held on the seat 25.

When fixedly holding the child car seat 10 on the seat 25 by the seat belt 26 combined with the seat 25, the child car seat 10 is separated from the holding base 10 as shown in FIG. 4. The child car seat 10 is placed on the seat 25, the seat belt 26 is pulled out, a lap strap 26a of the seat belt 26 is passed through the belt guides 13 formed on the opposite side surfaces of the seat part 10b of the child car seat body 10a, and then a latching tongue connected to the seat belt 26 is inserted in a buckle connected to the body of the passenger car. As indicated by dotted lines in FIG. 4, a shoulder strap 26b of the seat belt 26 is extended along the back surface of the back part 10c of the child car seat body 10a so as to extend through the second belt guide 17. Thus, the child car seat 10 is fixedly mounted on the seat 25.

The child car seat 10 can be used as either an ISO type which uses the holding base 18 to hold the child car seat 10 fixedly on the seat 25 or a universal type which holds the child car seat 10 fixedly on the seat 25 with the seat belt 26.

Figure 5:
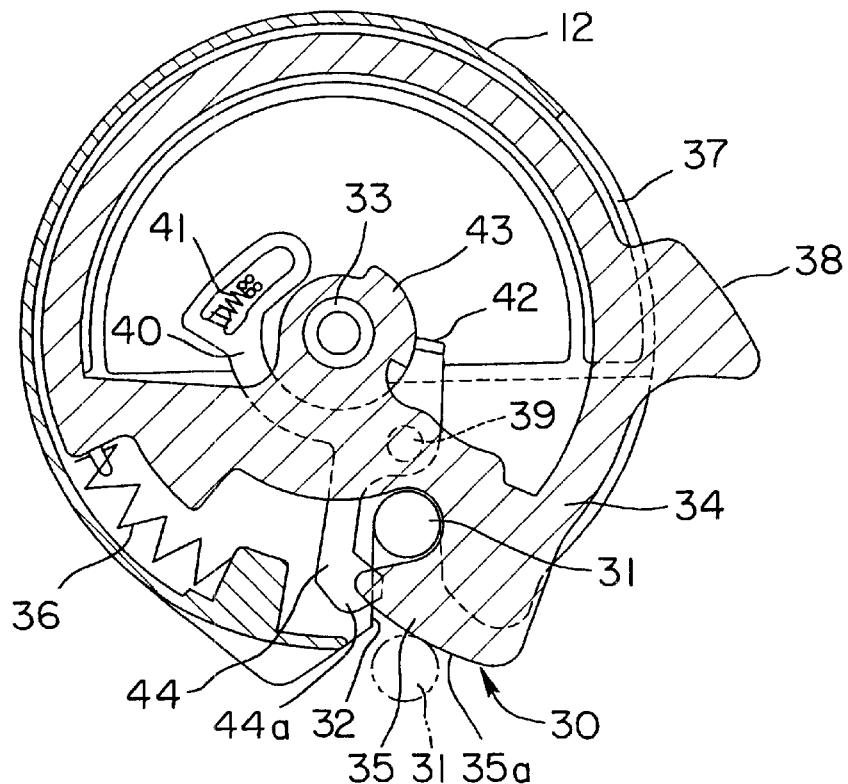
FIG. 5 is a sectional view of a locking device included in the child car seat shown in FIG. 1, in a locking state.
Figure 6:
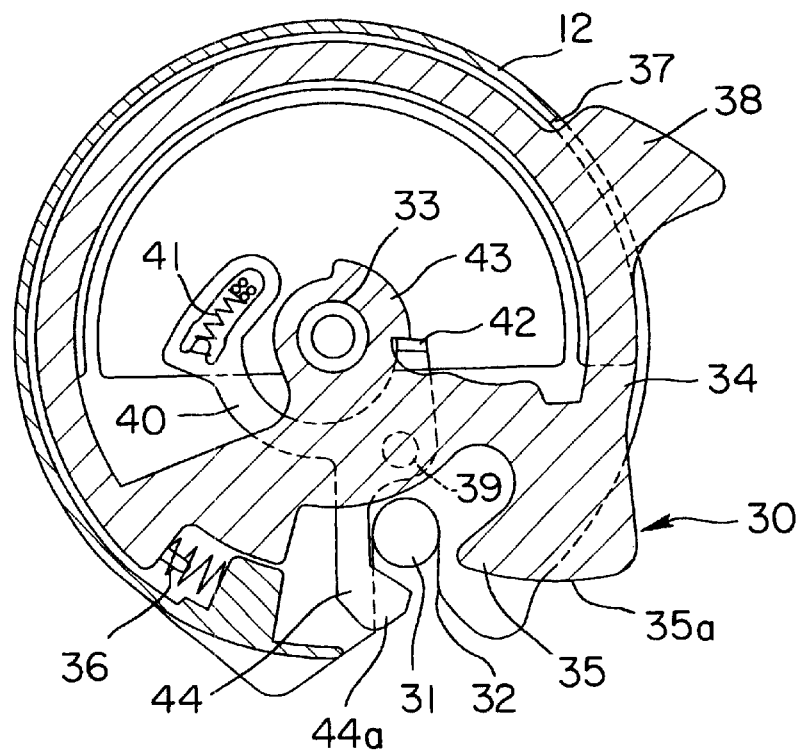
FIG. 6 is a sectional view of the locking device shown in FIG. 5, in a releasing state.
Figure 7:
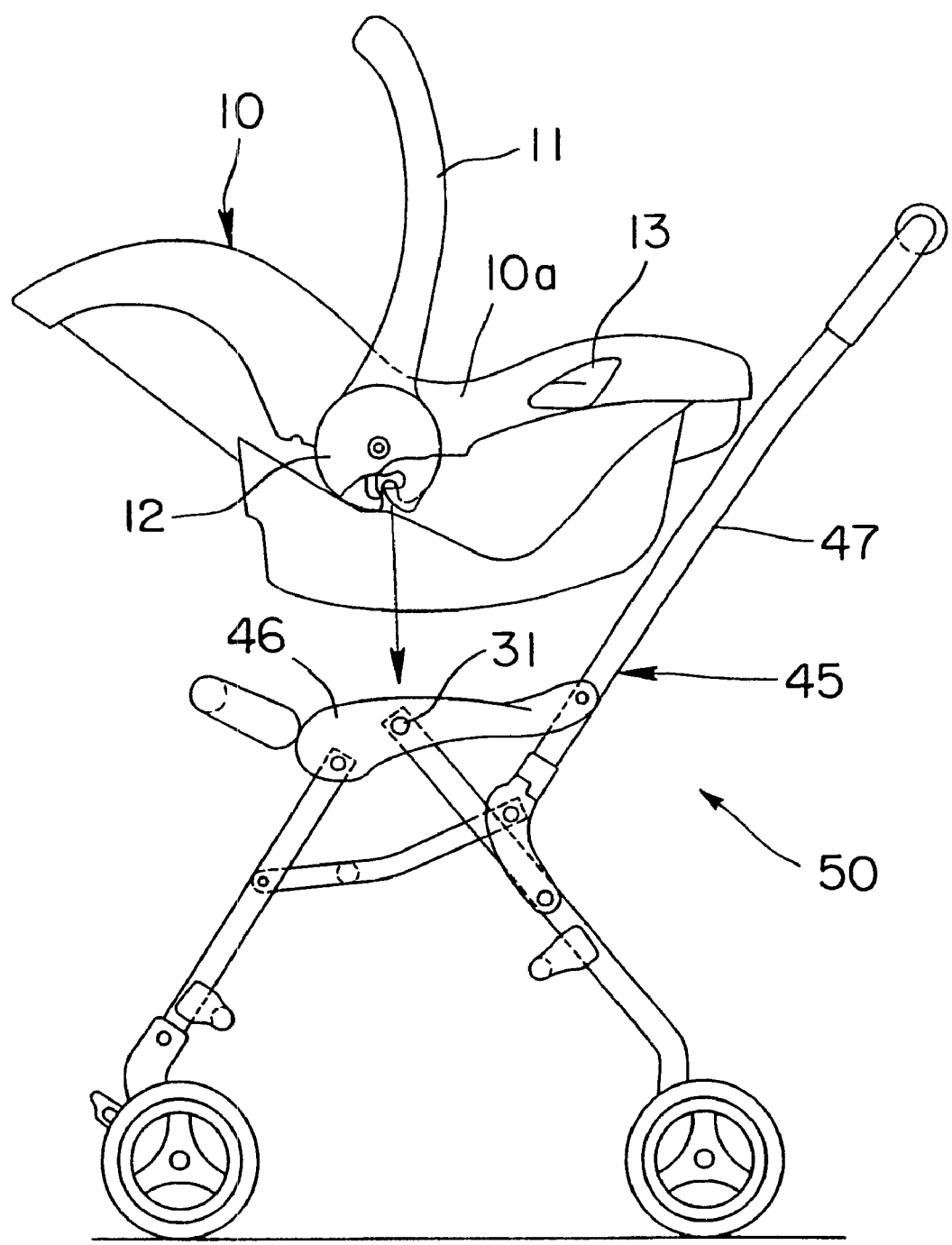
FIG. 7 is a view of assistance in explaining a procedure for installing the child car seat shown in FIG. 1 on a baby carriage body.

The handle holders 12 are provided with locking devices 30, respectively. The locking devices 30 engage with projections 31 formed on the right and the left armrest of a baby carriage body 45 of a baby carriage 50 as shown in FIG. 7 to lock the child car seat body 10a in place on the baby carriage body 45. Referring to FIGS. 5 and 6 showing the locking device 30 in sectional views, a substantially vertical slot 32 capable of receiving the projection 31 therein is formed in a side wall on the side of the child car seat body 10a of the handle holder 12, and a locking member 34 is supported for turning in the handle holder 12 on a pivot 33 projecting from the child car seat body 10a.

A hook 35 capable of engaging with the projection 31 received in the slot 32 is formed integrally with the locking member 34. A guide surface 35a is formed on the lower surface of the hook 35. When the guide surface 35a is pressed against the projection 31 as the baby seat 10 is lowered toward the baby carriage body 45, the locking member 34 is turned in a releasing direction. The locking member 34 is biased in a locking direction to bring the hook 35 into engagement with the projection 31 by a spring 36. A knob 38 is formed on the outer surface of the locking member 34 so as to project radially outward through a circumferential slit 37 formed in the handle holder 12.

A pivot 39 eccentric to the pivot 33 supporting the locking member 34 is formed in the handle holder 12, and a stopper 40 is supported for turning on the pivot 39. The stopper 40 is biased by a spring 41 in a direction opposite the direction in which the locking member 34 is biased by the spring 36. The stopper 40 is provided with a stopping part 42. When the locking member 34 is turned to a releasing position, the stopping part 42 engages with a protrusion 43 formed on the locking member 34 to retain the locking member 34 automatically at the releasing position as shown in FIG. 6. The stopper 40 has a releasing arm 44 extending downward and provided in its lower end part with a releasing part 44a. The projection 31 engages with the releasing part 44a to disengage the stopping part 42 from the protrusion 43 by turning the stopper 40 against the resilience of the spring 41.

When installing the child car seat 10 on the baby carriage body 45, the child car seat 10 is lowered toward the unfolded baby carriage body 45 to insert a lower part of the child car seat body 10a in a space between the right and the left armrest 46 so that the right and the left handle holder 12 of the child car seat body 10a are engaged with the upper surfaces and the outer side surfaces of the armrests 46. Then, the child car seat body 10a is depressed to bring the guide surface 35a of the locking member 34 of each handle holder 12 into contact with the projection 31 of the baby carriage body 45. Consequently, the locking member 34 is turned counterclockwise, as viewed in FIG. 5, against the resilience of the spring 36, and the hook 35 is shifted to one side of the slot 32 to permit the projection 31 to engage in the slot 32 of the handle holder 12.

Figure 8:
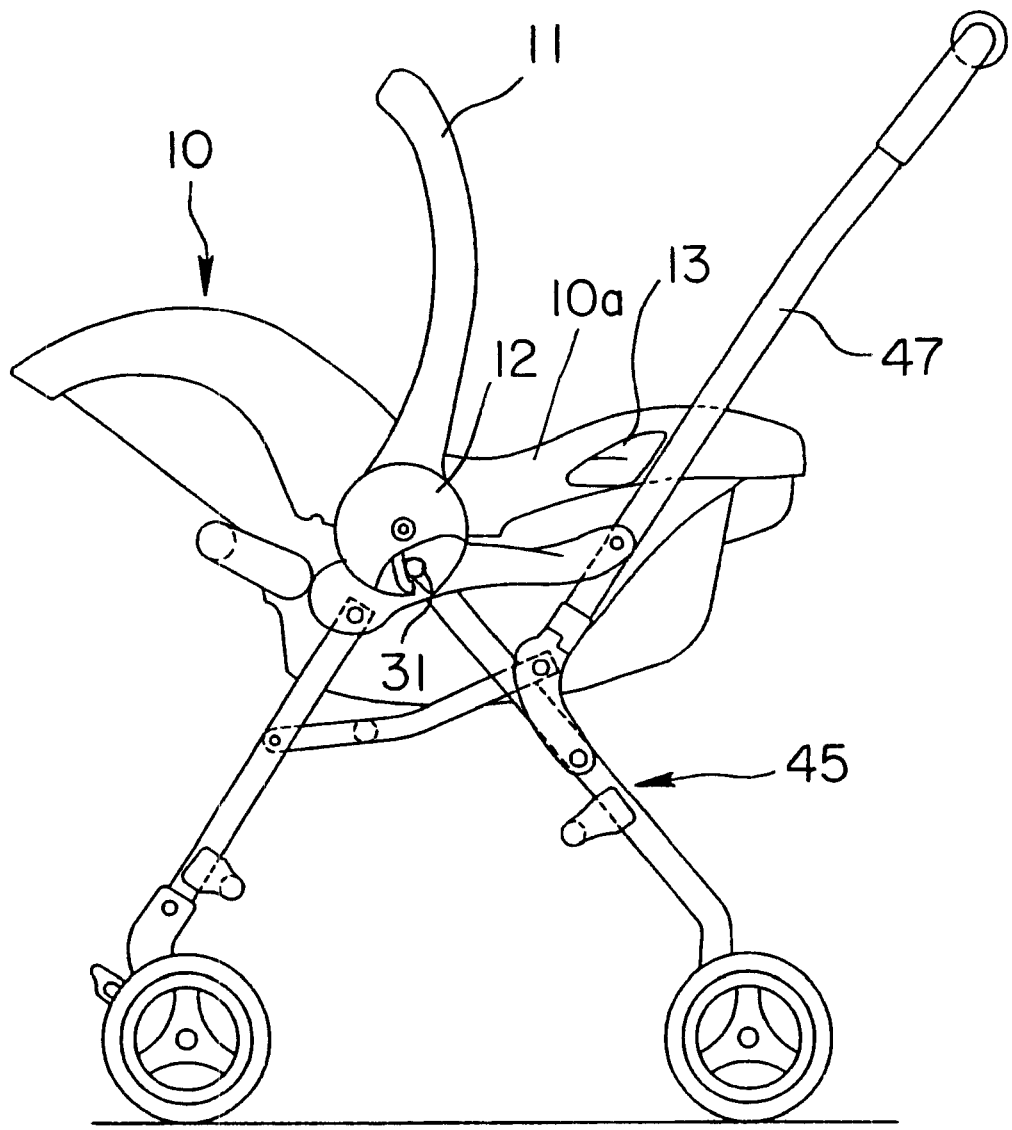
FIG. 8 is a side elevation of the child car seat shown in FIG. 1 installed on the baby carriage body.

After the projection 31 has engaged in the slot 32 of the handle holder 12, the locking member 34 is turned clockwise, as viewed in FIG. 5 by the spring 36 and the hook 35 engages with the projection 31. The child car seat 10 is locked in place on the baby carriage body 45, the front and the rear parts of the handle holders 12 are seated on the armrests 46, and the belt guides 13 rest on the handle 47 of the baby carriage body 45. Thus, the child car seat 10 is fixedly installed on the baby carriage body 45 as shown in FIG. 8 to complete the baby carriage 50.

When separating the child car seat 10 from the baby carriage body 45, the knob 38 is moved upward to a position shown in FIG. 6 to turn the locking member 34 counterclockwise, so that the hook 35 is turned to the releasing position. Then, the stopper 40 is turned on the pivot 39 by the spring 41, the stopping part 42 engages with the protrusion 43 of the locking member 34 automatically to retain the locking member 34 at the releasing position.

Then, the child car seat 10 is lifted up to separate the child car seat 10 from the baby carriage body 45. As the child car seat 10 is lifted up, the releasing part 44a comes into engagement with the projection 31 and the stopper 40 is turned clockwise on the pivot 39 against the resilience of the spring 41. Consequently, the stopping part 42 is disengaged from the protrusion 43 and the locking member 34 is returned automatically from the releasing position to the locking position as shown in FIG. 5 by the spring 36.

The child car seat 10 separated from the baby carriage body 45 can be used as a carrier for carrying a baby lying on the baby seat 10. The handle 11 is set in an upright position as shown in FIG. 9 and is held by a hand. The child car seat 10 can be used as a rocking chair. The handle 11 is inclined substantially in parallel to the back part 10c of the child car seat body 10a and the child car seat 10 is placed on a floor F as shown in FIG. 10. The child car seat 10 is able to rock on the rocking frames 14. When the handle 11 is turned further to a position shown in FIG. 11 and the child car seat 10 is placed on a floor, the handle 11 restrains the child car seat body 10a from rocking. Thus, the child car seat 10 can be used as an ordinary chair.

The child car seat thus constructed can be used in either of the ISO type and the universal type on a passenger car, and can be used also as any of a seat for a baby carriage, a carrier, a rocking chair and an ordinary chair. Thus, the child car seat can be applied to various purposes.

Second Embodiment

A child car seat in a second embodiment according to the present invention will be described with reference to FIGS. 12 to 18.

Figure 12:
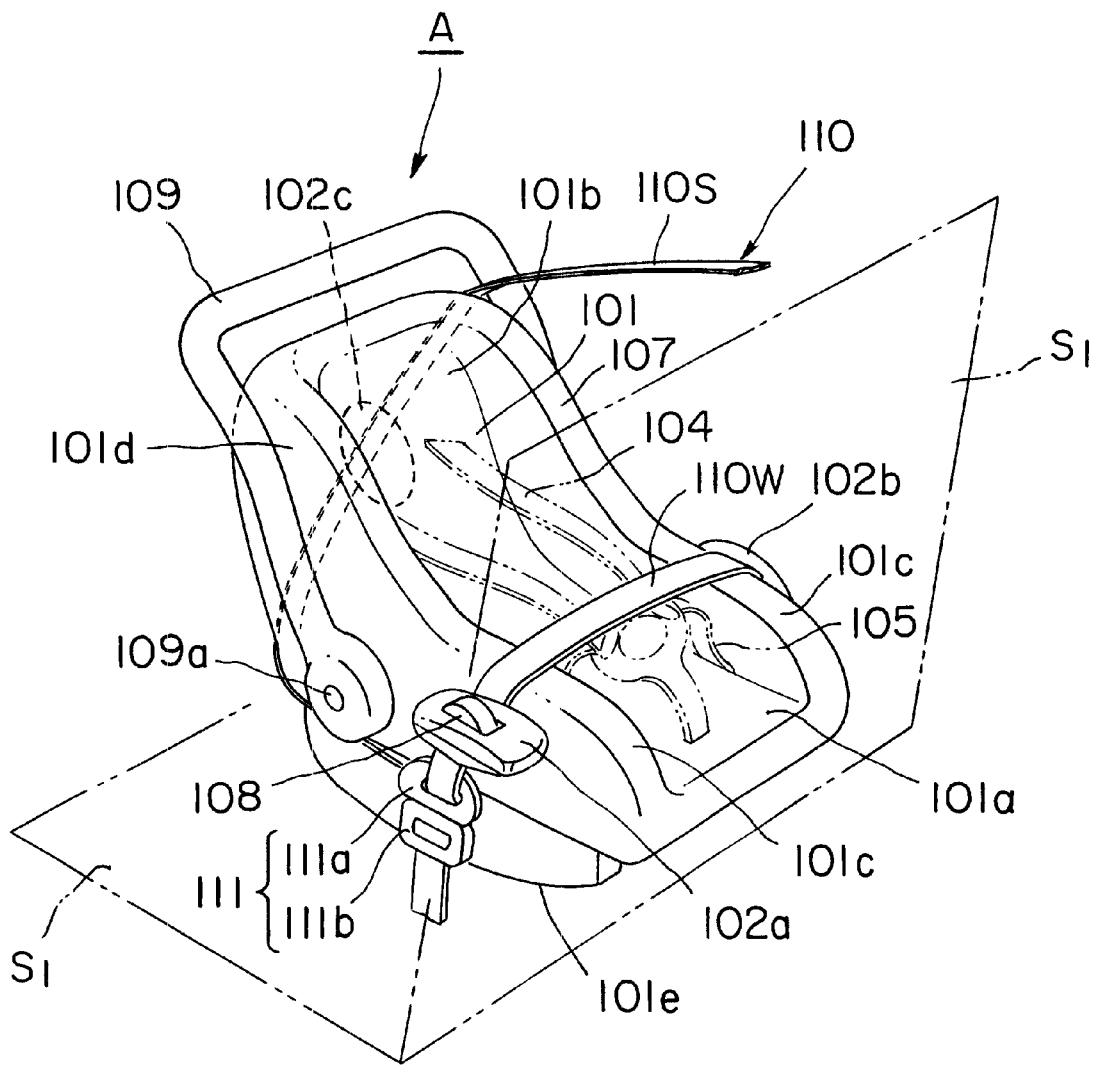
FIG. 12 is a perspective view of a child car seat in a second embodiment according to the present invention.

Referring to FIG. 12 showing a child car seat A in a second embodiment according to the present invention in a perspective view, the child car seat A has a child car seat body 101 and a handle 109 pivotally supported on pivots 109 on a substantially middle part of the child car seat body 101. The child car seat body 101 has a seat part 101a on which a baby is seated, a back part 101b continuous with the seat part 101a, and right and left armrests 101c rising from the opposite sides of the seat part 101a at a substantially right angle or a small obtuse angle to the surface of the seat part 101a. The handle 109 is used when carrying the child car seat body 101 together with a baby lying on the child car seat body 101.

The child car seat A is provided with a shoulder strap 104, a lap strap 105, and a belly protector 106 rising from the seat part 101a to a position corresponding to the abdomen of a baby seated on the seat part 101a. The surface of the child car seat body 101 which may touch a baby seated on the child car seat body 101 is covered with a seat cushion 107.

When mounting the child car seat A on a seat S1 of a car, the child car seat A is fastened to the seat S1 by a lap-and-diagonal seat belt 110 of the car. A latching tongue 111a put on the seat belt 110 is held and pulled by a hand to pull out the seat belt 110 from the side of a back belt 110s. Then, the seat belt 110 is extended through a belt guide 102c (fastening means) formed on the back part 101b of the child car seat body 101 toward the front of the child car seat body 101, and the latching tongue 111a is inserted in and engaged with a buckle body 111b of a buckle 111. The lap strap 110w, on which the latching tongue 111a is put, of the seat belt 110 is extended through a belt guide 102a combined with one of the armrests 101c toward the other armrest 101c, is passed through a belt guide 102b combined with the other armrest 101c, and is fixed to an anchor fixed to the car.

An angle gage 108 is incorporated into the belt guide 102a combined with the armrest 101c of the child car seat body 101. Two angle gages 108 may be incorporated into both the belt guides 102a and 102b to enable quick angle recognition regardless of the position of the child car seat A on the seat of the car.

The angle gage 108 is placed in the belt guide 102a which is seen without fail when the child car seat A is fastened to the seat by the seat belt 110. Therefore, the angle gage 108 can be readily seen. The angle gage 108 placed in the belt guide 102a is simple and small in construction and hence can be manufactured at a low cost.

Figure 13A:
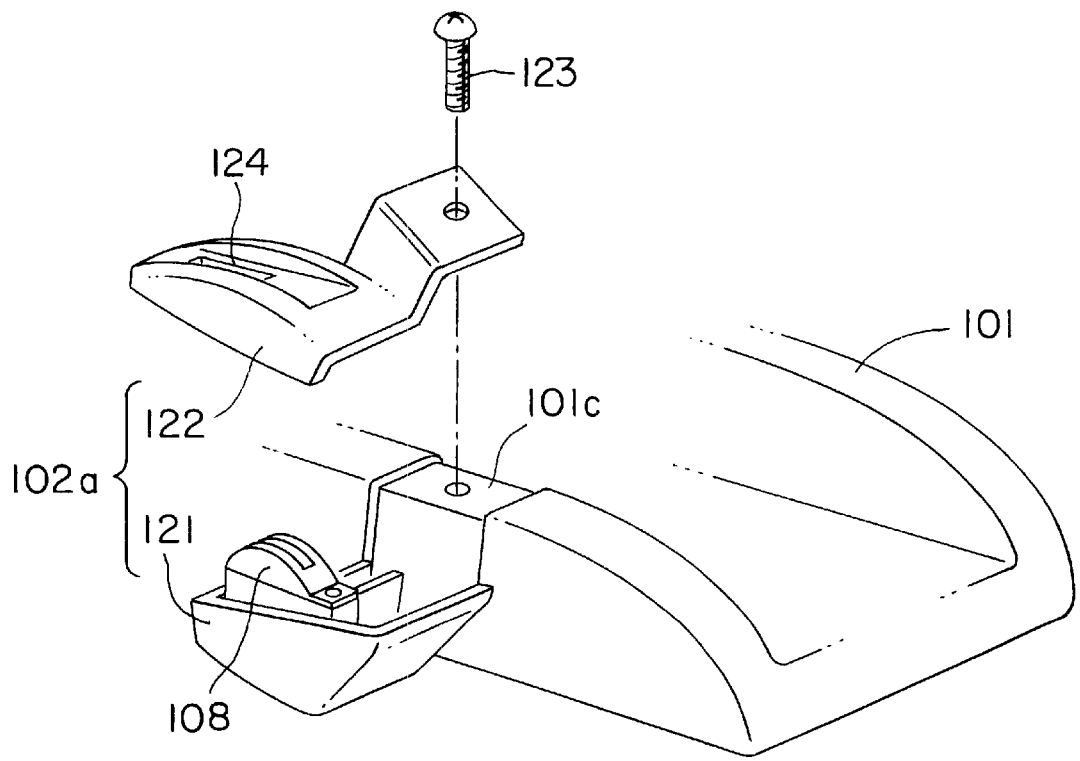
FIG. 13A is an exploded perspective view of a belt guide provided with an angle gage.
Figure 13B:
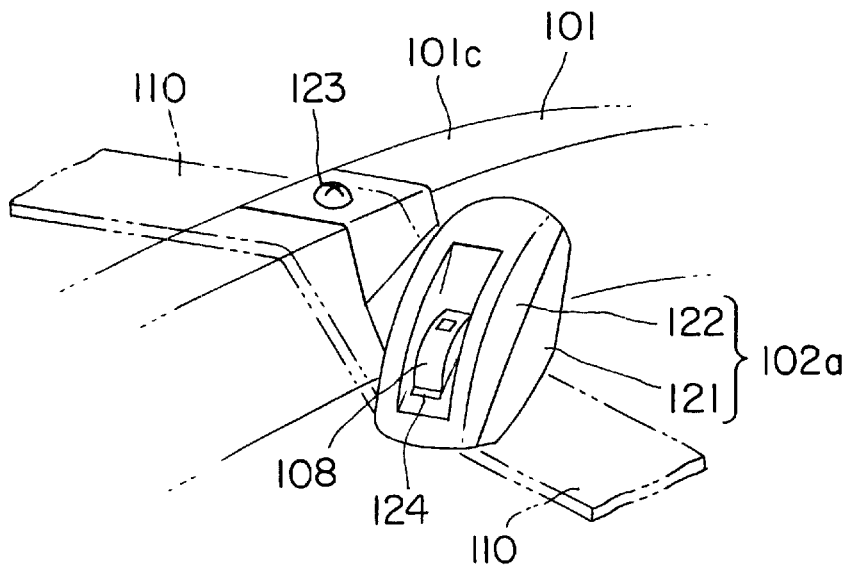
FIG. 13B is a perspective view of a belt guide provided with an angle gage.

FIGS. 12A and 12B are enlarged perspective views of the belt guide 102a shown in FIG. 12. FIG. 13A is an exploded perspective view of assistance in explaining the belt guide 102a including the angle gage 108, and FIG. 13B is a perspective view of the same belt guide 102a as viewed from another direction. Referring to FIGS. 13A and 13B, the belt guide 102a combined with the armrest 101c of the child car seat body 101 has a belt guide case 121 and a belt cover 122. The belt guide case 121 is formed integrally with the armrest 101c, the belt cover 122 is put on the belt guide case 121, and the belt cover 122 is fastened to the armrest 101c with a screw 123. The angle gage 108 is supported for rotation in the belt guide case 121.

As shown in FIG. 13B, a part of the angle gage 108 protrude through an opening 124 formed in the belt cover 122 from the belt cover 122. The seat belt 110 is extended through a gap between the armrest 101c and the belt guide case 121.

When mounting the child car seat A on and fastening the same to the seat S of the car, the seat belt 110 is extended around the belt guide case 121 and hence the angle gage 108 included in the belt guide 102a is seen without fail.

FIG. 14 is a longitudinal sectional view on a plane including a middle part of the belt guide 102a shown in FIG. 13B. Referring to FIG. 14, the angle gage 108 includes an angle gage case 181 provided with holes 181a, and an angular position indicating wheel 182 provided with a shaft 182a' and placed in the angle gage case 181. The opposite end parts of the shaft 182a" of the angular position indicating wheel 182 are fitted in the holes 181a of the angle gage case 181 to support the angular position indicating wheel 182 for rotation on the angle gage case 181.

The angle gage 108 having the angular position indicating wheel 182 thus supported on the angle gage case 181 is mounted on an angle gage support 121a formed on the belt guide case 121 and is fastened to the angle gage support 121a with a screw 183. The angle gage support 121a is a rib formed on the belt guide case 121. The angle gage case 181 is put on the rib with its flat lower surface joined to the upper surface of the rib and the angle gage case 181 is fastened to the rib with the screw 183.

The angle gage case 181 may be held firmly between the belt guide case 121 and the belt cover 122 instead of fastening the angle gage 108 to the angle gage support 121a with the screw 183.

The angle gage 108 is shown in an exploded perspective view in FIGS. 15A and 15B. FIG. 15A is a perspective view of the angle gage case 181 and FIG. 15B is a perspective view of the angular position indicating wheel 182 supported for rotation in the angle gage case 181 shown in FIG. 15A.

The angle gage case 181 has a transparent, semicylindrical top wall 181c provided in its middle part with an index line 181b. The index line 181b is an engraved linear groove or a linear protrusion. The index line 181b indicates an angle. Since the angle gage case 181 is a transparent, plastic molding, the engraved linear line or the linear protrusion is an effective index line 181b. If the angle gage case 181 is opaque, it is preferable to use a slot instead of the index line 181b. The holes 181a are formed in middle parts of the side walls of the angle gage case 181, and opposite end parts of the shaft 182a' of the angular position indicating wheel 182 are fitted in the holes 181a, respectively.

Referring to FIG. 15B, the angular position indicating wheel 182 has an upper round part 182a and a lower straight part 182b. Usually, the angular position indicating wheel 182 is a lightweight member made of a plastic material. The shaft 182a' is held coaxially with the round part 182a by four spokes. The straight part 182b serves as a weight (balancer).

The operation of the angle gage 108 will be described.

The angle gage case 181 is semicylindrical. The outside diameter of the angular position indicating wheel 182 is slightly smaller than the inside diameter of the angle gage case 181. The angular position indicating wheel 182 is held in the angle gage case 181 and is able to turn freely on the shaft 182a' in the angle gage case 181. For example, when the child car seat body 101 is tilted counterclockwise as viewed in FIG. 14, the belt guide 202a fixed to the child car seat body 101, and the angle gage case 181 fixed to the belt guide 202a are tilted together with the child car seat body 101. In this case the angular position indicating wheel 182 turns on the shaft 182a' relative to the angle gage case 181 and maintains its natural position in which the straight part 182b extends in the direction of gravitation because the straight part 182b of the angular position indicating wheel 182 serves as a weight. Therefore, when angles, such as "10°", "20°", and such, or working ranges, such as "OK" (proper) and "NG" (improper) are marked on the circumference 182c of the angular position indicating wheel 182, the user is able to understand the condition of child car seat A by reading the mark coinciding with the index line 181b formed on the top wall 181c of the angle gage case 181.

The angular position-indicating wheel 182 stabilizes quickly and the mark can be recognized quickly if the straight part 182b has a large weight.

FIGS. 16A and 16B another possible angular position indicating wheel 182. FIG. 16A is a perspective view of the angular position indicating wheel 182 and FIG. 16B is an exploded side elevation of the angular position indicating wheel 182.

The angular position-indicating wheel 182 is formed of a plastic material and is lightweight. Therefore the balancing ability of the angular position-indicating wheel 182 is not necessarily satisfactory. A balancing weight 185 is attached to a straight part 182b. The balancing weight 185 may include a bolt 185a, a nut 185b and a washer 185c.

Although the invention has been described as applied to a child car seat for babies less than 10 kg specified in Section W1, JIS, the present invention is not limited thereto in its practical application and is applicable to child car seats for children of weigh in the range of 9 to 18 kg specified in Section W2, JIS and those for children of weight in the range of 15 to 25 kg specified in Section W3, JIS. The present invention is applicable not only to child car seats specified in JIS, but also to those specified in foreign standards.

When fastening the child car seat A to a seat S1 of a car by the seat belt 110 of the car, the seat belt 110 is extended along a predetermined path around the child car seat A. The angle gage 108 may be disposed at a part of the child car seat A close to or in the vicinity of the seat belt fastening the child car seat A to the seat S1 of the car.

Figure 17:
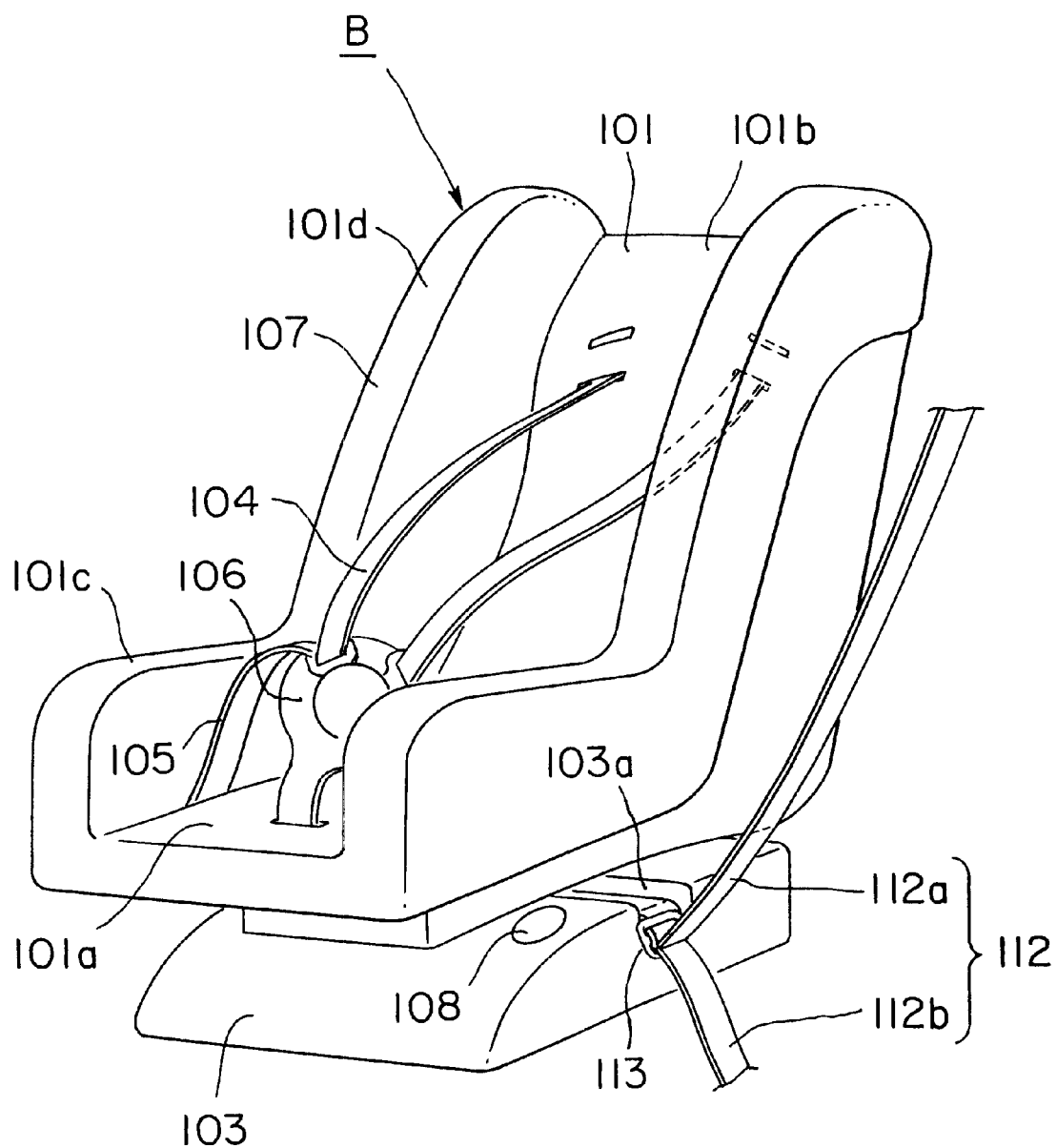
FIG. 17 is a perspective view of a child car seat according to the present invention provided with an angle gage placed near a belt passing part of a base.
Figure 18:
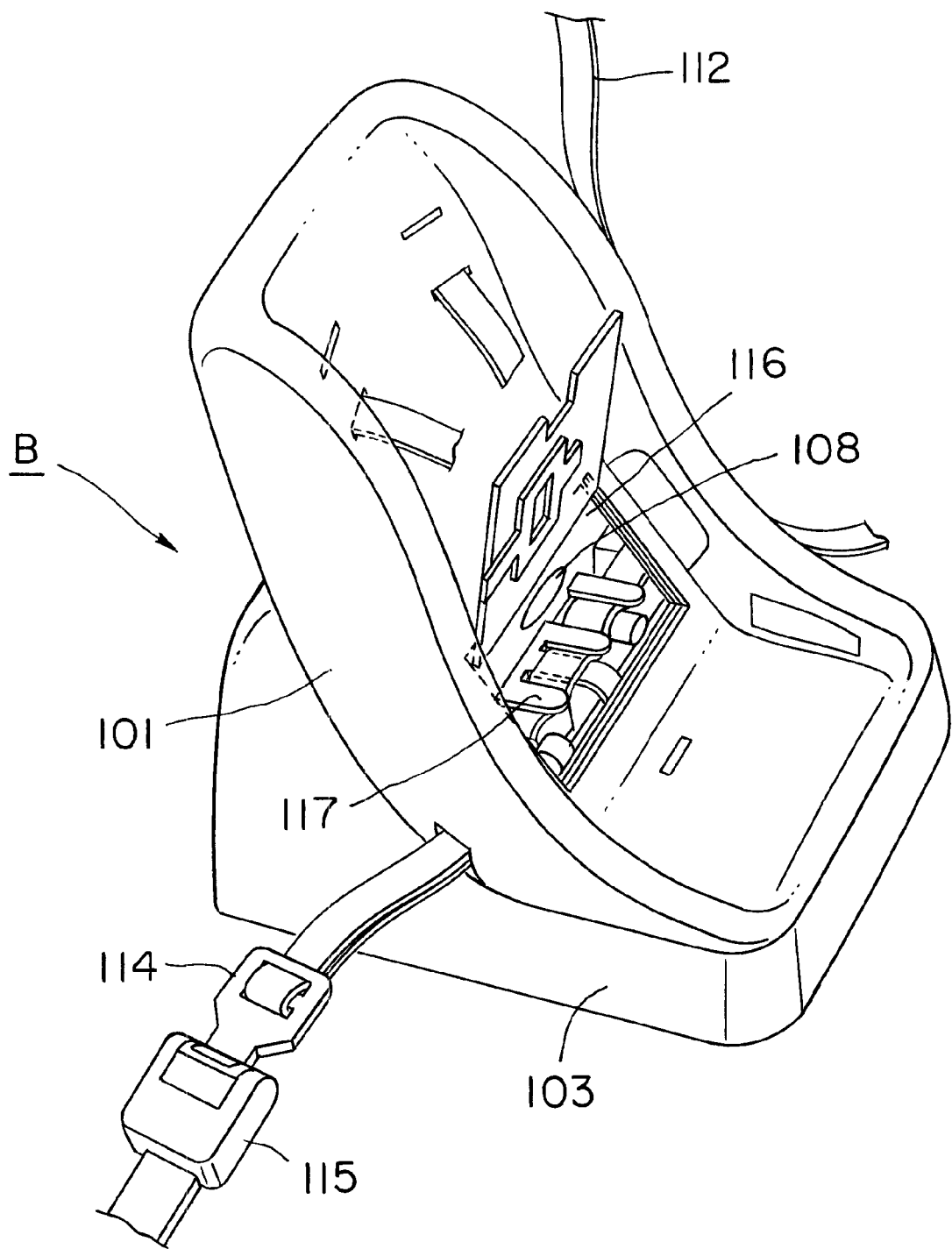
FIG. 18 is perspective view of a child car seat according to the present invention provided with an angle gage placed close to an operating opening formed in a front wall of a child car seat body.

The angle gage 108 thus disposed is seen automatically when fastening the child car seat A to the seat S1 of the car by extending the seat belt 110 around the child car seat A and hence failure in recognizing an indication on the angle gage 108 can be prevented. FIGS. 17 and 18 show angle gages 108 disposed close to routes around child car seats along which the seat belt is extended, respectively.

FIG. 17 shows an angle gage 108 disposed near a groove 103a formed in a base 103 included in a child car seat B. A seat belt is extended through the groove 103a. The child car seat B has a child car seat body 101 having a seat part 101a on which a baby is seated, a back part 101b continuous with the seat part 101a, right and left armrests 101c rising from the opposite sides of the seat part 101a at a substantially right angle or a small obtuse angle to the surface of the seat part 101a, and right and left side holders 101d rising from the opposite sides of the back part 101b at a substantially right angle or a small obtuse angle to the surface of the back part 101b, and a base 103 holding thereon the child car seat body 101 such that the child car seat body 101 can be turned in a horizontal plane and/or the child car seat body 101 can be reclined. The groove 103a is formed in the upper surface of the base 103 facing the child car seat body 101. A latching tongue 111a put on the seat belt 112 of the car is passed through the groove 103a and is engaged with a buckle 111b fixed to the floor of the car, and a clip is put on the joint of the shoulder strap 112a and the lap strap 112b of the seat belt 112 to fasten the child car seat B to the seat of the car.

Since the angle gage 108 is disposed close to the groove 103a through which the seat belt 112 of the car is passed necessarily, the user installing the child car seat B sees the angle gage 108 without fail when putting the clip 113 on the seat belt 112.

The angle gage 108 can be attached to a part near the groove 103a of the base 103 like that shown in FIG. 14.

Referring to FIG. 18, a clip 117 is fixedly held in an operating opening 116 formed in a central part of a front wall of a child car seat body 101. Whereas it is possible that the clip 113 shown in FIG. 17 is lost, the clip 117 fixedly held in the operating opening 116 will not be lost.

In this child car seat B in an example of the second embodiment, an angle gage 108 is disposed close to the clip 117 fixedly held in the operating opening 116.

As shown in FIG. 18, the child car seat B has a child car seat body 101 on which a baby is seated, and a base 103 for holding the child car seat body 101 in a proper position on a seat of a car. The child car seat body 101 is supported for turning and tilting or is combined integrally with the base 103. A latching tongue 114 put on a seat belt 112 is passed through a belt passing part of the child car seat body 101, the latching tongue 114 is engaged with a buckle 115, and the clip 117 fixedly held in the operating opening 116 is put on the seat belt 112 as shown in FIG. 18. The angle gage 108 is closed to the clip 117 fixedly held in the operating opening 116 formed in the front wall of the child car seat body 101. Therefore, the user sees the angle gage 108 without fail when putting the clip 117 on the seat belt 112.

The angle gage 108 may be placed on the base 103 as mentioned in the description made in connection with FIG. 14 or may be placed on the child car seat body 101.

According to the present invention, the angle gage is disposed close to the belt guide which is seen necessarily or close to the route along which the seat belt is extended when installing the child car seat on the seat of the car.

Since the angle gage is disposed with its indicating part facing up, indication on the angle gage can be easily seen and troublesome child car seat installing work can be simplified.

The angle gage having the angle gage case and the angular position indicating wheel is simple in construction and is inexpensive.

The angular position indicating wheel provided with marks indicating angular ranges enables the instant decision as to whether or not the child car seat is installed in a proper angular position, which farther facilitate the child car seat installing work.

The lightweight angular position indicating wheel of a plastic material provided with the balancing weight stabilizes quickly, which enables quick installation of the child car seat.

The angle gage held in the belt guide which is not very large is simple, small and inexpensive and is satisfactory in appearance.

Third Embodiment

A baby carriage in a third embodiment according to the present invention will be described with reference to FIGS. 19 to 26.

Figure 19:
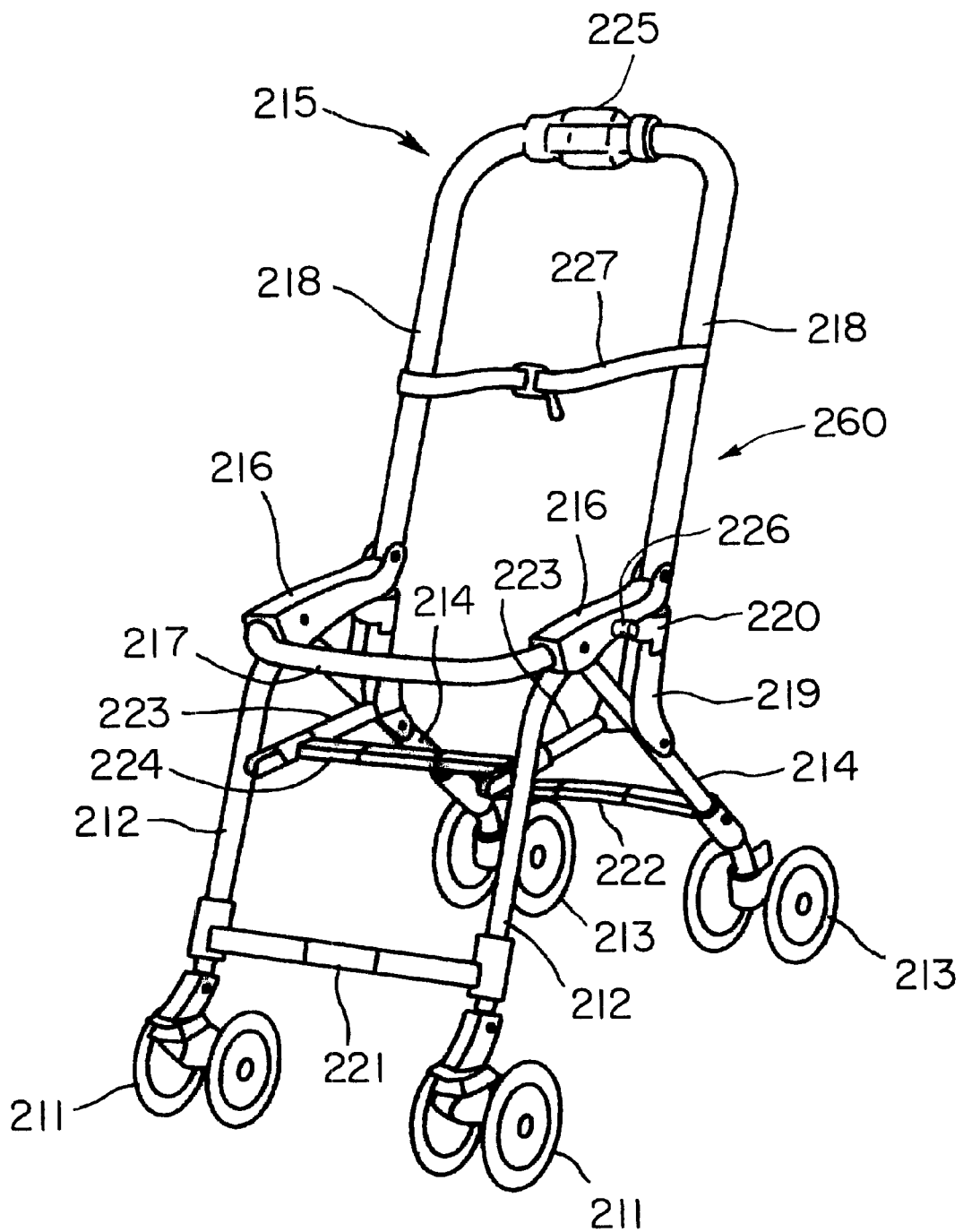
FIG. 19 is perspective view of a baby carriage body included in a baby carriage in a third embodiment according to the present invention.

Referring to FIG. 19, a baby carriage body 260 includes right and left front legs 212 supporting front wheels 211, right and left rear legs 214 supporting rear wheels 213, a substantially U-shaped handle 215, right and left armrests 216, and a detachable guard bar 217 extended between the armrests 216. Rear end parts of the armrests 216 are joined pivotally to lower parts of right and left side parts 218 of the handle 215, respectively. Front end parts of the armrests 216 are joined pivotally to upper end parts of the front legs 212, respectively. Upper end parts of the right and the left rear leg 214 are joined pivotally to middle parts of the armrests 216, respectively. Lower ends of L-shaped brackets 219 are joined pivotally to middle parts of the rear legs 214. Lower ends of the right and the left side part 218 of the handle 215 are joined pivotally to middle parts of the brackets 219, respectively. When the baby carriage body 260 is developed, locking members 220 slidably put on lower parts of the right and the left side part 218 of the handle 215 engage with the brackets 219 to maintain the baby carriage body 260 in a developed state.

A front cross bar 221 is extended between the right and the left front leg 212, and a rear cross bar 222 is extended between the right and the left rear leg 214. Each of connecting bars 223 has a front end joined pivotally to the front leg 212 and a rear end joined pivotally to the lower end of the side part 218 of the handle 215 together with the bracket 219. An upper cross bar 224 is extended between middle parts of the right and the left connecting bar 223.

As shown in FIG. 19, the locking members 220 put on the lower end parts of the right and the left side part 218 of the handle 215 are engaged with the upper end parts of the brackets 219 to hold the baby carriage body 260 in a developed state for use. An operating device 225 held on the handle 215 is operated to disengage the locking members 220 from the brackets 219. Consequently, the armrests 216 and the connecting bars 223 can be turned upward on pivots supporting the armrests 216 and the connecting bars 223, and the front legs 212 and the rear legs 214 can be extended substantially in parallel to each other to fold the baby carriage body 260 to facilitate carrying the baby carriage body 260.

Figure 20:
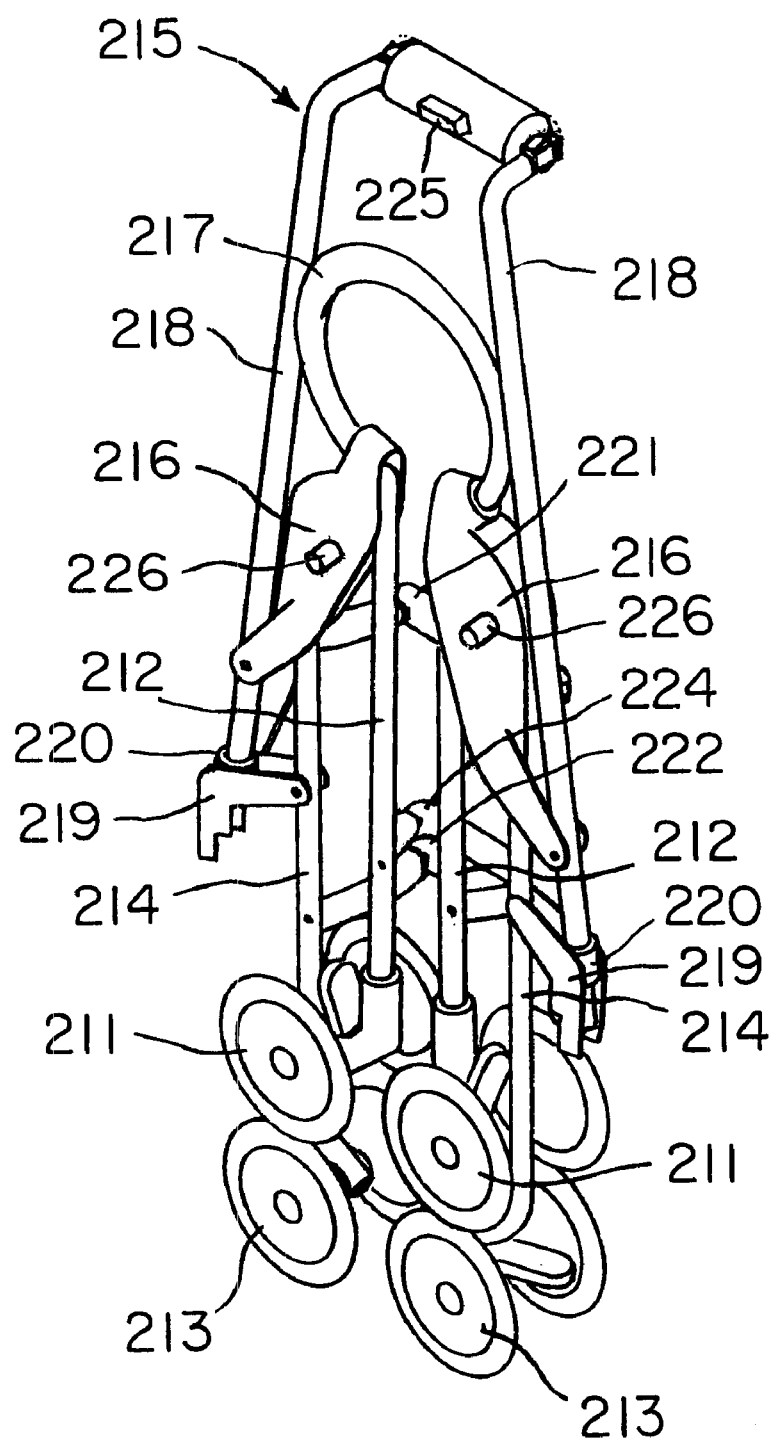
FIG. 20 is a perspective view of the baby carriage body shown in FIG. 19, in a folded state.

Each of the handle 215, the front cross bar 221, the rear cross bar 222 and the upper cross bar 224 is provided with two joints in its middle part. The joints of the handle 215, the front cross bar 221, the rear cross bar 222 and the upper cross bar 224 are included in two vertical planes. Thus, the handle 215, the front cross bar 221, the rear cross bar 222 and the upper cross bar 224 can be folded. After folding the baby carriage body 260 in a state where the front legs 212 and the rear legs 214 are parallel to each other, the right and left side parts 218 are moved forward. Then, the opposite ends parts of the handle 215, the front cross bar 221, the rear cross bar 222 and the upper cross bar 224 are turned forward relative to the middle parts of the same and, consequently, the baby carriage body 260 can be compactly folded in three as shown in FIG. 20.

The construction of the baby carriage body 260 is the same as that of a conventional baby carriage body. The right and the left armrest 216 of the baby carriage body 260 of the present invention are provided with projections 226 projecting laterally outward from the outer surfaces of middle parts thereof. A belt 227 for adjusting the inclination of a seat mounted on the baby carriage body 260 is connected to middle parts of the right and the left side part 218.

FIG. 21 is a perspective view of a child car seat 230 having a child car seat body 230a capable of being mounted on the baby carriage body 260. A handle 231 of a shape substantially resembling the inverted letter U is connected for turning to the child car seat body 230a. Handle holders 232 are formed on the opposite sidewalls of the child car seat body 230a, and opposite end parts of the handle 231 are inserted in the handle holders 232, respectively. The handle 231 can be turned or fixed. Belt guides 233 (fastening means) are formed on the opposite sides of a seat part 230b of the child car seat body 230a. The belt guides 233 are used for fastening the child car seat body 230a to a seat 25 of a passenger car with a seat belt of the car.

Figure 22:
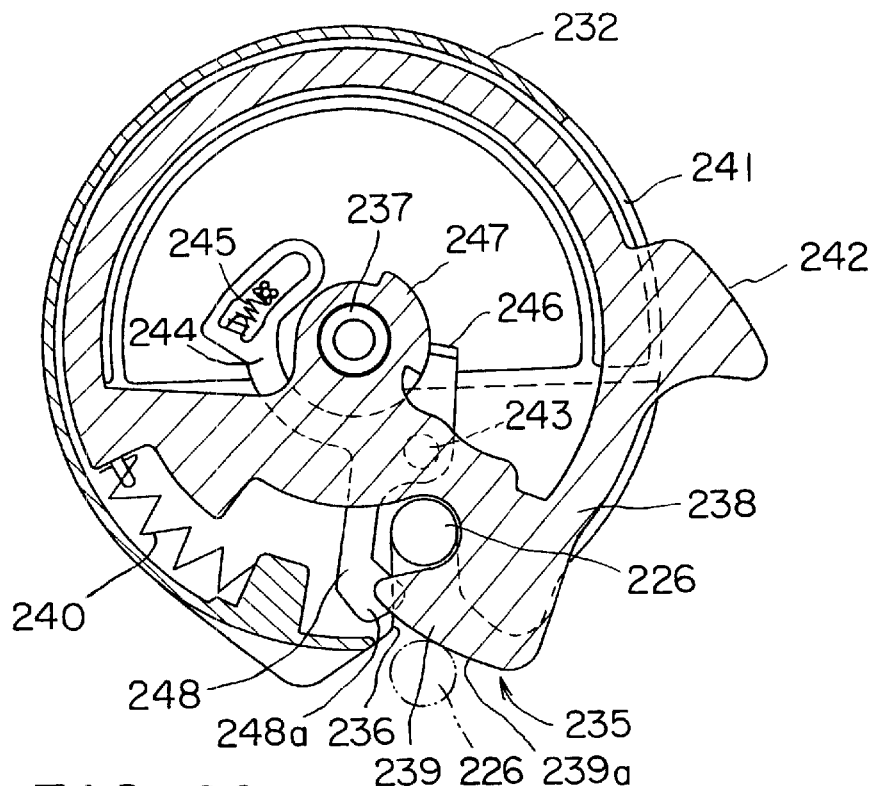
FIG. 22 is a sectional view of a locking device in a locking state.
Figure 23:
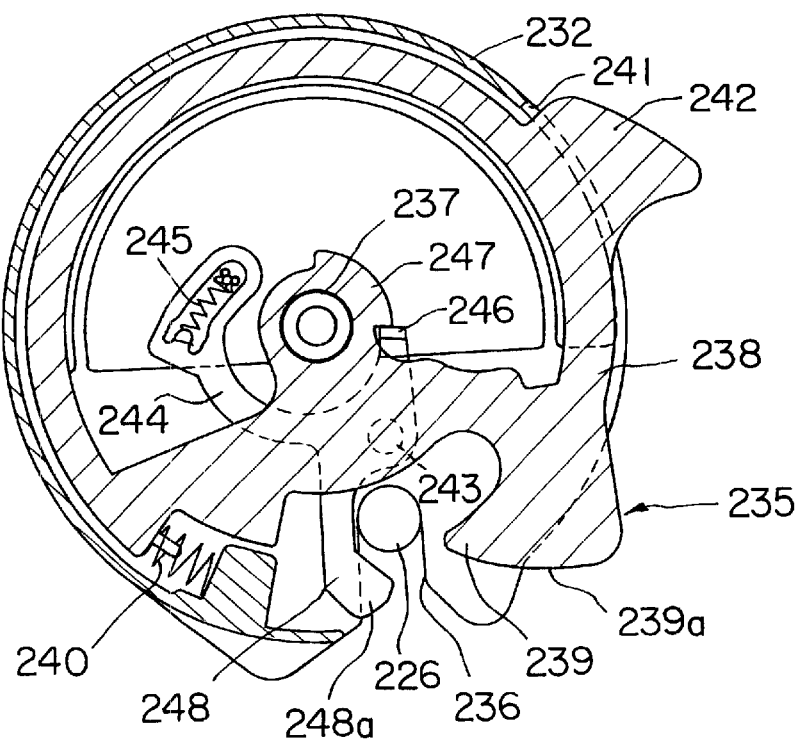
FIG. 23 is a sectional view of the locking device shown in FIG. 22, in a releasing state.
Figure 24:
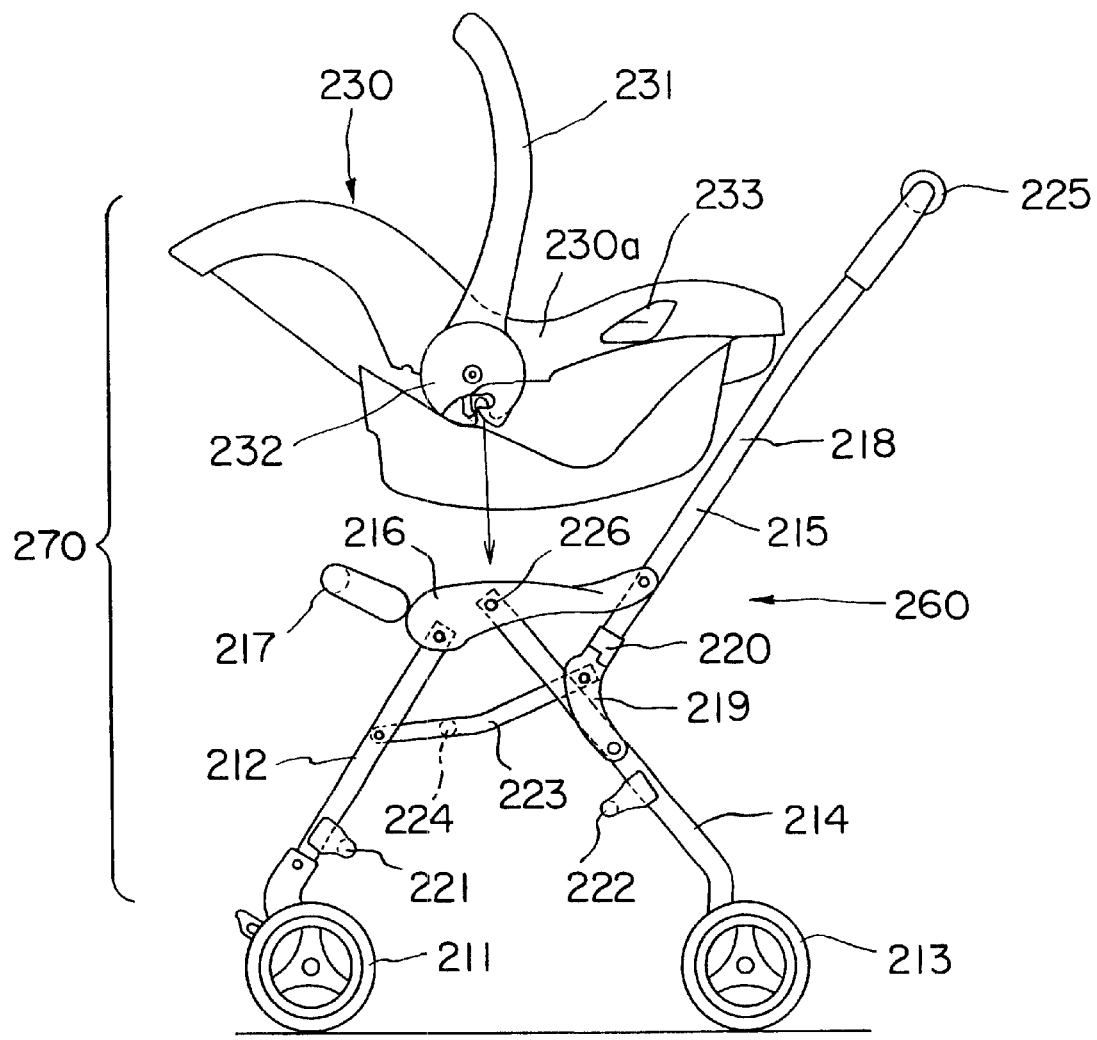
FIG. 24 is view of assistance in explaining a procedure for installing the child car seat on the baby carriage body.

The handle holders 232 are provided with locking devices 235, respectively. The locking devices 235 engage with the projections 226 formed on the right and the left armrest 216 of the baby carriage body 260 to lock the child car seat 260 in place on the baby carriage body 260. Referring to FIGS. 22 and 23 showing the locking device 235 in sectional views, a substantially vertical slot 236 capable of receiving the projection 226 therein is formed in a side wall on the side of the child car seat 230 of the handle holder 232, and a locking member 238 is supported for turning in the handle holder 232 on a pivot 237 projecting from the child car seat 230.

A hook 239 capable of engaging with the projection 226 received in the slot 236 is formed integrally with the locking member 238. A guide surface 239a is formed on the lower surface of the hook 239. When the guide surface 239a is pressed against the projection 226, the locking member 238 is turned in a releasing direction. The locking member 238 is biased in a locking direction by a spring 240 to bring the hook 239 into engagement with the projection 226. A knob 242 is formed on the outer surface of the locking member 238 so as to project radially outward through a circumferential slit 241 formed in the handle holder 232.

A pivot 243 eccentric to the pivot 237 supporting the locking member 238 is formed in the handle holder 232, and a stopper 244 is supported for turning on the pivot 243. The stopper 244 is biased by a spring 245 in a direction opposite the direction in which the locking member 238 is biased by the spring 240. The stopper 244 is provided with a stopping part 246. When the locking member 238 is turned to a releasing position, the stopping part 246 engages with a protrusion 247 formed on the locking member 238 to retain the locking member 238 automatically at the releasing position as shown in FIG. 23. The stopper 244 has a releasing arm 248 extending downward and provided in its lower end part with a releasing part 248a. The projection 226 engages with the releasing part 248a to disengage the stopping part 246 from the protrusion 247 by turning the stopper 244 against the resilience of the spring 245.

When installing the child car seat 230 on the baby carriage body 260, the child car seat 230 is lowered toward the unfolded baby carriage body 260 to insert a lower part of the child car seat 230 in a space between the right and the left armrest 216 so that the right and the left handle holder 232 of the child car seat 230 are engaged with the upper surfaces and the outer side surfaces of the armrests 216. Then, the child car seat 230 is depressed to bring the guide surface 239a of the locking member 238 of each handle holder 232 into contact with the projection 226 of the baby carriage body 260. Consequently, the locking member 238 is turned counterclockwise, as viewed in FIG. 22, against the resilience of the spring 240, the hook 239 is shifted to one side of the slot 236 to permit the projection 226 to engage in the slot 236 of the handle holder 232.

Figure 25:
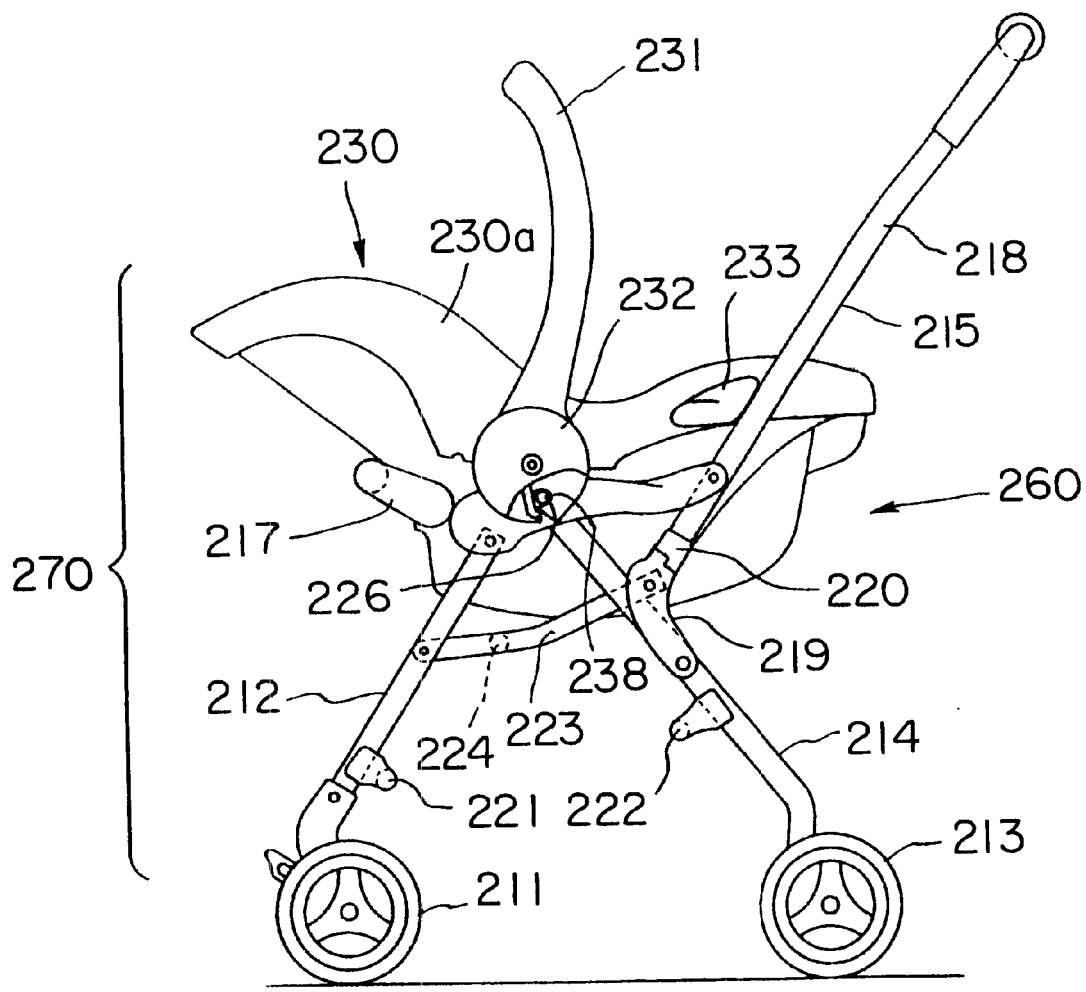
FIG. 25 is a side elevation of the child car seat installed on the baby carriage body.

After the projection 226 has engaged in the slot 236 of the handle holder 232, the locking member 238 is turned clockwise, as viewed in FIG. 22 by the spring 240 and the hook 239 engages with the projection 226. The child car seat 230 is locked in place on the baby carriage body 260, the front and the rear parts of the handle holders 232 are seated on the armrests 216, and the belt guides 233 rest on the right and the left side part 218 of the handle 215 of the baby carriage body 260. Thus, the child car seat 230 is fixedly installed on the baby carriage body 260 as shown in FIG. 25 to complete the baby carriage 270.

When separating the child car seat 230 from the baby carriage body 260, the knob 242 is moved upward to a position shown in FIG. 23 to turn the locking member 238 counterclockwise, so that the hook 239 is turned to the releasing position. Then, the stopper 244 is turned on the pivot 243 by the spring 245, the stopping part 246 engages with the protrusion 247 of the locking member 238 automatically to retain the locking member 238 at the releasing position.

Then, the child car seat 230 is lifted up to separate the child car seat 230 from the baby carriage body 260. As the child car seat 230 is lifted up, the releasing part 248a comes into engagement with the projection 226 and the stopper 246 is turned clockwise on the pivot 243 against the resilience of the spring 245. Consequently, the stopping part 246 is disengaged from the protrusion 247 and the locking member 238 is returned automatically from the releasing position to the locking position as shown in FIG. 22 by the spring 240.

Figure 26:
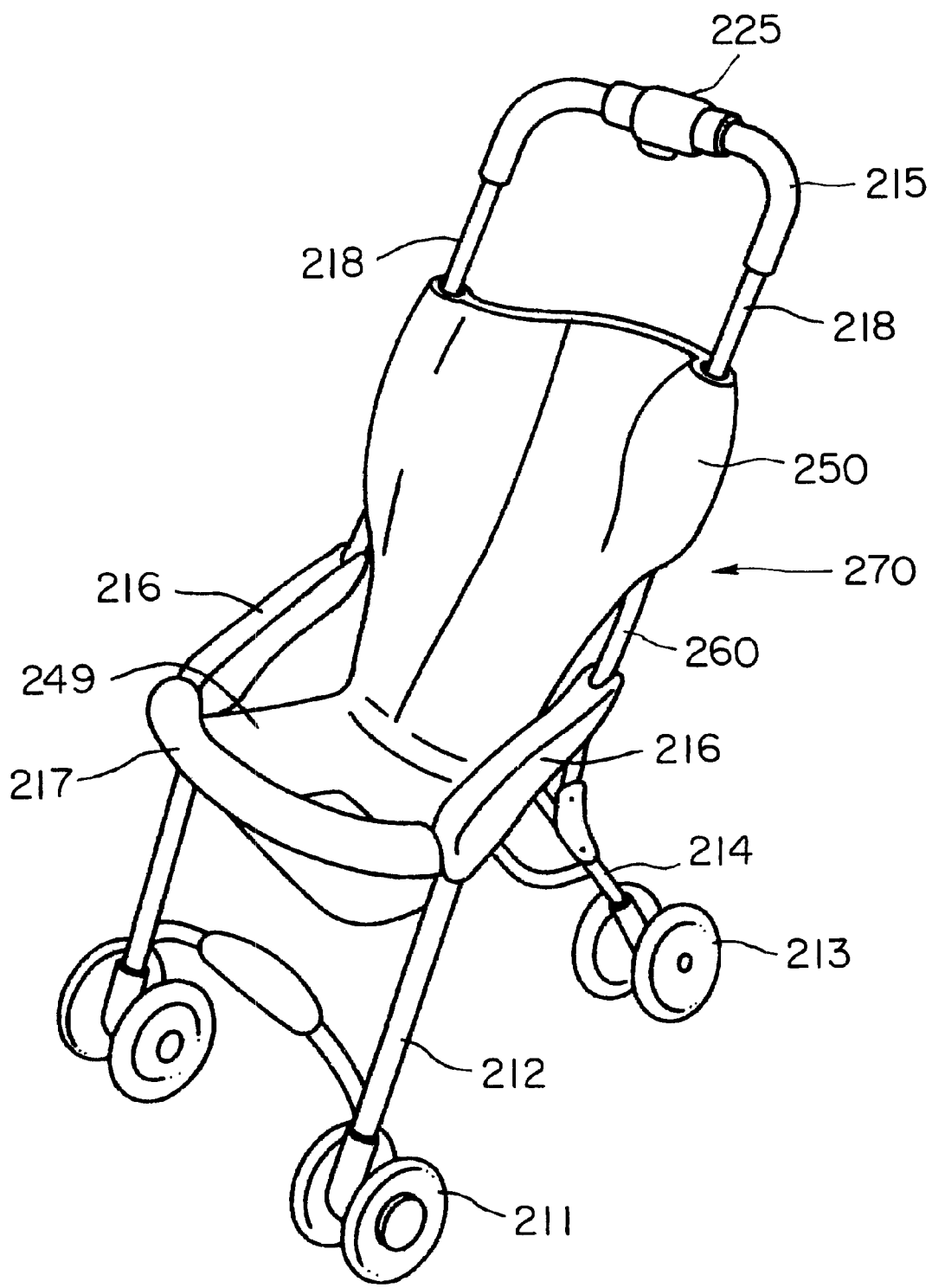
FIG. 26 is a perspective view of the baby carriage in use without being provided with the child car seat.

Generally, the baby carriage body 260 is fixedly provided with a sheet forming a seat 249, the baby carriage body 260 can be used as the baby carriage 270 not using the child car seat 230 simply by holding a back part 250 of the sheet between the right and the left side part 218 of the handle 215 by the belt 227 for adjusting the inclination of a seat mounted on the baby carriage body 260 as shown in FIG. 26 after removing the child car seat 230 from the baby carriage body 260. When the baby carriage 270 is not in use, the baby carriage body 260 can be folded in three as shown in FIG. 20 after removing the child car seat 230 from the baby carriage body 260.

As apparent from the foregoing description, according to the present invention, the projections are projected outward from the outer sides of the right and the left armrest of the baby carriage body, and the child car seat is provided with locking devices which engage with the projections, respectively, to lock the child car seat in place on the baby carriage body. Thus, the child car seat can be detachably mounted on the baby carriage body without using any special attachments, influence on the design can be limited to the least extent, and the baby carriage body can be formed in compact construction. The baby carriage body can be used as a baby carriage without using the child car seat, and the baby carriage body can be folded in three.

What is claimed is:

1. A child car seat to be mounted on a car seat provided with a seat belt, said child car seat comprising:

a child car seat body to be fastened to the car seat and also provided with locking devices which engage with projections formed on a baby carriage body of a baby carriage, and a fastening means incorporated into the child car seat body to fasten the child car seat body to the car seat including a holding base for connection with fixing members in said car seat, the holding base having a holding opening and grooves opening upward, said holding opening engaging a holding part of said child car seat body, said grooves engaging a rod of said child car seat body.

2. The child car seat according to claim 1, wherein the fastening means provided belt guides provided in the child car seat body and capable of engaging the seat belt.

3. The child car seat according to claim 1, wherein a handle is rotatably connected to the child car seat body by handle holders.

4. A child car seat to be mounted on a car seat provided with a seat belt, said child car seat comprising:

a child car seat body to be fastened to the car seat, having locking devices which engage projections on a baby carriage body, each of the locking devices including a locking member which turns relative to the child car seat body and engages the projections to lock the child car seat body in place, wherein each locking member is provided with a hook for engaging a projection of the baby carriage body from below, and a guide surface is formed in the lower surface of the hook for contacting the projection and to turn the locking member in a releasing direction when the child car seat is mounted on the baby carriage body, and a fastening means incorporated into the child car seat body to fasten the child car seat body to the car seat.

5. The child car seat according to claim 4, wherein a handle is rotatably connected to the child car seat body through handle holders, and the locking devices are held in the handle holders, respectively.

6. A child car seat to be mounted on a car seat provided with a seat belt, said child car seat comprising:

a child car seat body to be fastened to the car seat, having locking devices which engage projections on a baby carriage body, each of the locking devices including a locking member which turns relative to the child car seat body and engages the projections to lock the child car seat body in place, wherein the locking device includes a stopper which engages a protrusion formed on the locking member when the locking member is turned in a releasing direction to hold the locking member at a releasing position, and the stopper turns about an axis eccentric to an axis about which the locking member turns.

7. The child car seat according to claim 6, wherein the locking member is biased in a locking direction.

8. The child car seat according to claim 6, wherein the stopper has a releasing arm extending downward, a releasing part projects from a lower part of the releasing arm, and the releasing part comes into contact with the projection of the baby carriage body to disengage the protrusion of the locking member from the stopper when the child car seat is lifted up, so that the locking member is returned from the releasing position.

9. A child car seat to be mounted on a car seat provided with a seat belt, said child car seat comprising:

a child car seat body to be fastened to the car seat, and a fastening means incorporated into the child car seat body to fasten the child car seat body to the car seat including belt guides capable of engaging the seat belt, each belt guide being provided with an angle gage which indicates the angle of movement of a handle of said child car seat body, the angle gage including an angle gage case, and an angular position-indicating wheel supported on the angle gage case.

10. The child car seat according to claim 9, wherein angular ranges are provided on the angular position indicating wheel, and the angle gage case is provided with a window through which the angular ranges can be seen or a mark for indicating the angular range.

11. The child car seat according to claim 10, wherein the angle gage is combined with the belt guide so that an indication of the angular range on the angle gage can be visually observed from above the angle gage.

12. The child car seat according to claim 9, wherein the angular position-indicating wheel is provided with a balancer in its lower part.

13. The child car seat according to claim 9, wherein
the angle gage is disposed at a position near a seat belt extending route on the child car seat body.

14. A baby carriage comprising:
a baby carriage body provided with a pair of armrests; and
a child car seat capable of being detachably installed on the baby carriage body;
wherein each armrest is provided with a projection, and
the child car seat includes a child car seat body, and locking devices for engaging the projections, each of the locking devices including a locking member which turns relative to the child car seat body and engages the projection to lock the child car seat body in place, wherein the locking member is provided with a hook for engaging the projection of the baby carriage body from below, and a guide surface is formed in the lower surface of the hood so as to come into contact with the projection and to turn the locking member in a releasing direction when the child car seat is mounted on the baby carriage body.

15. A baby carriage comprising:
a baby carriage body provided with a pair of armrests; and
a child car seat capable of being detachably installed on the baby carriage body;
wherein each armrest is provided with a projection, and
the child car seat includes a child car seat body, and locking devices for engaging the projections, each of the locking devices including a locking member which turns relative to the child car seat body and engages the projection to lock the child car seat body in place wherein the locking member includes a stopper which engages with a protrusion formed on the locking member when the locking member is turned in the releasing direction to hold the locking member at a releasing position, and the stopper turns about an axis eccentric to an axis about which the locking member turns.

16. The baby carriage according to claim 15, wherein
the stopper has a releasing arm extending downward, a releasing part projects from a lower part of the releasing arm, and the releasing part comes into contact with the projection of the baby carriage body to disengage the protrusion of the locking member from the stopper when the child car seat is lifted up, so that the locking member is returned automatically from the releasing position.

* * * * *